United States Patent
Nagahama et al.

(10) Patent No.: US 8,112,272 B2
(45) Date of Patent: Feb. 7, 2012

(54) SOUND SOURCE SEPARATION DEVICE, SPEECH RECOGNITION DEVICE, MOBILE TELEPHONE, SOUND SOURCE SEPARATION METHOD, AND PROGRAM

(75) Inventors: Katsumasa Nagahama, Atsugi (JP); Shinya Matsui, Ebina (JP)

(73) Assignee: Asashi Kasei Kabushiki Kaisha, Osaka (JP)

( * ) Notice: Subject to any disclaimer, the term of this patent is extended or adjusted under 35 U.S.C. 154(b) by 984 days.

(21) Appl. No.: 11/990,200

(22) PCT Filed: Aug. 11, 2006

(86) PCT No.: PCT/JP2006/315953
§ 371 (c)(1),
(2), (4) Date: Feb. 8, 2008

(87) PCT Pub. No.: WO2007/018293
PCT Pub. Date: Feb. 15, 2007

(65) Prior Publication Data
US 2009/0055170 A1    Feb. 26, 2009

(30) Foreign Application Priority Data
Aug. 11, 2005    (JP) ................... 2005-233195

(51) Int. Cl.
H04H 40/63    (2008.01)
G10L 21/02    (2006.01)

(52) U.S. Cl. .......................... 704/226; 381/10

(58) Field of Classification Search .................. 704/205, 704/226, 233; 381/10, 86, 91, 92, 389
See application file for complete search history.

(56) References Cited

U.S. PATENT DOCUMENTS

| | | | |
|---|---|---|---|
| 6,420,975 B1 * | 7/2002 | DeLine et al. | 340/815.4 |
| 7,327,852 B2 * | 2/2008 | Ruwisch | 381/356 |
| 2004/0185804 A1 | 9/2004 | Kanamori et al. | |
| 2008/0021703 A1 * | 1/2008 | Kawamura et al. | 704/226 |

FOREIGN PATENT DOCUMENTS

| | | |
|---|---|---|
| JP | 5-131866 | 5/1993 |
| JP | 2000-047699 | 2/2000 |
| JP | 2001-100800 | 4/2001 |
| JP | 2002-099297 | 4/2002 |
| JP | 2003-153372 | 5/2003 |
| JP | 2004-187283 | 7/2004 |
| JP | 2004-289762 | 10/2004 |
| JP | 2004-343700 | 12/2004 |

OTHER PUBLICATIONS

Ooga, J. et al., "Acoustic Systems and Digital Processing," The Institute of Electronics, Information and Communication Engineers, pp. 186-192, (1995). Haykin, S., "Adaptive Filter Theory," Prentice Hall Information and System Sciences Series, Fourth Edition, pp. 120-128, (2002).
ISR from Japanese Patent Office for PCT/JP2006/315953.
Iain A. McCowan et al., "Adaptive Parameter Compensation for Robust Hands-Free Speech Recognition Using a Dual Beamforming Microphone Array,"Proceedings of 2001 International Symposium on Intelligent Multimedia, Video and Speech Processing, May 2-4, 2001, Hong Kong, pp. 547-550.

* cited by examiner

*Primary Examiner* — Abul K Azad
(74) *Attorney, Agent, or Firm* — Finnegan, Henderson, Farabow, Garrett & Dunner, L.L.P.

(57) ABSTRACT

A sound source signal from a target sound source is allowed to be separated from a mixed sound which consists of sound source signals emitted from a plurality of sound sources without being affected by uneven sensitivity of microphone elements. A beamformer section 3 of a source separation device 1 performs beamforming processing for attenuating sound source signals arriving from directions symmetrical with respect to a perpendicular line to a straight line connecting two microphones 10 and 11 respectively by multiplying output signals from the microphones 10 and 11 after spectrum analysis by weighted coefficients which are complex conjugate to each other. Power computation sections 40 and 41 compute power spectrum information, and target sound spectrum extraction sections 50 and 51 extract spectrum information of a target sound source based on a difference between the power spectrum information.

13 Claims, 42 Drawing Sheets

FIG. 10
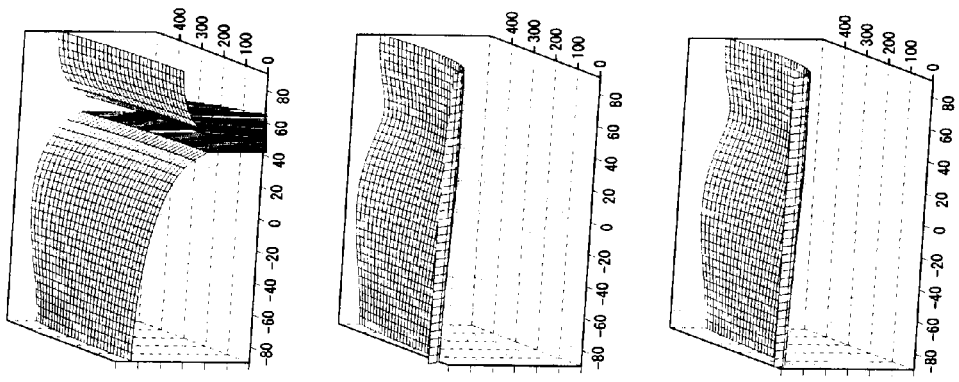
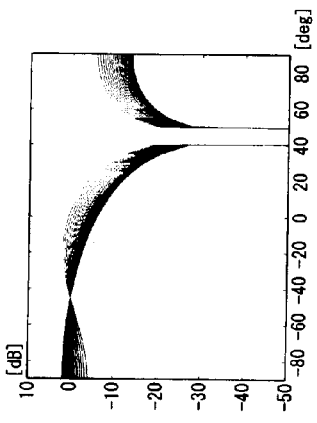
DIFFERENCE OF MICROPHONE
ELEMENT SENSITIVITIES
$\alpha = 0\,dB$
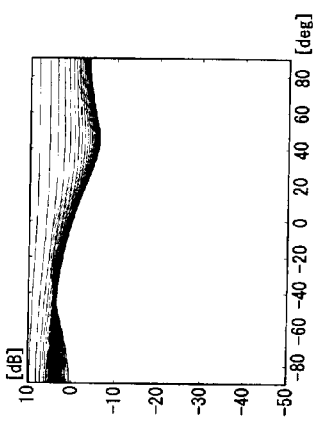
DIFFERENCE OF MICROPHONE
ELEMENT SENSITIVITIES
$\alpha = 6\,dB$
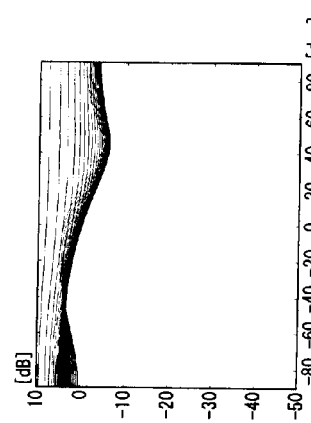
DIFFERENCE OF MICROPHONE
ELEMENT SENSITIVITIES
$\alpha = -6\,dB$ FIG. 11
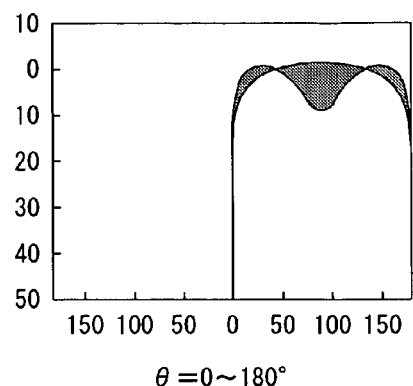
θ = 0~180°
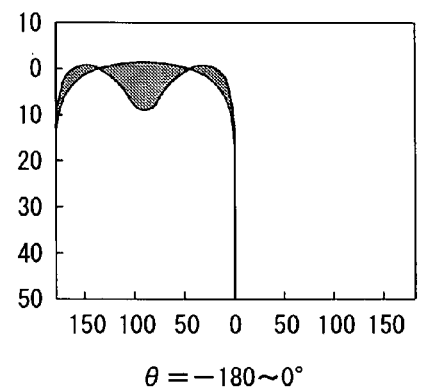
θ = −180~0°

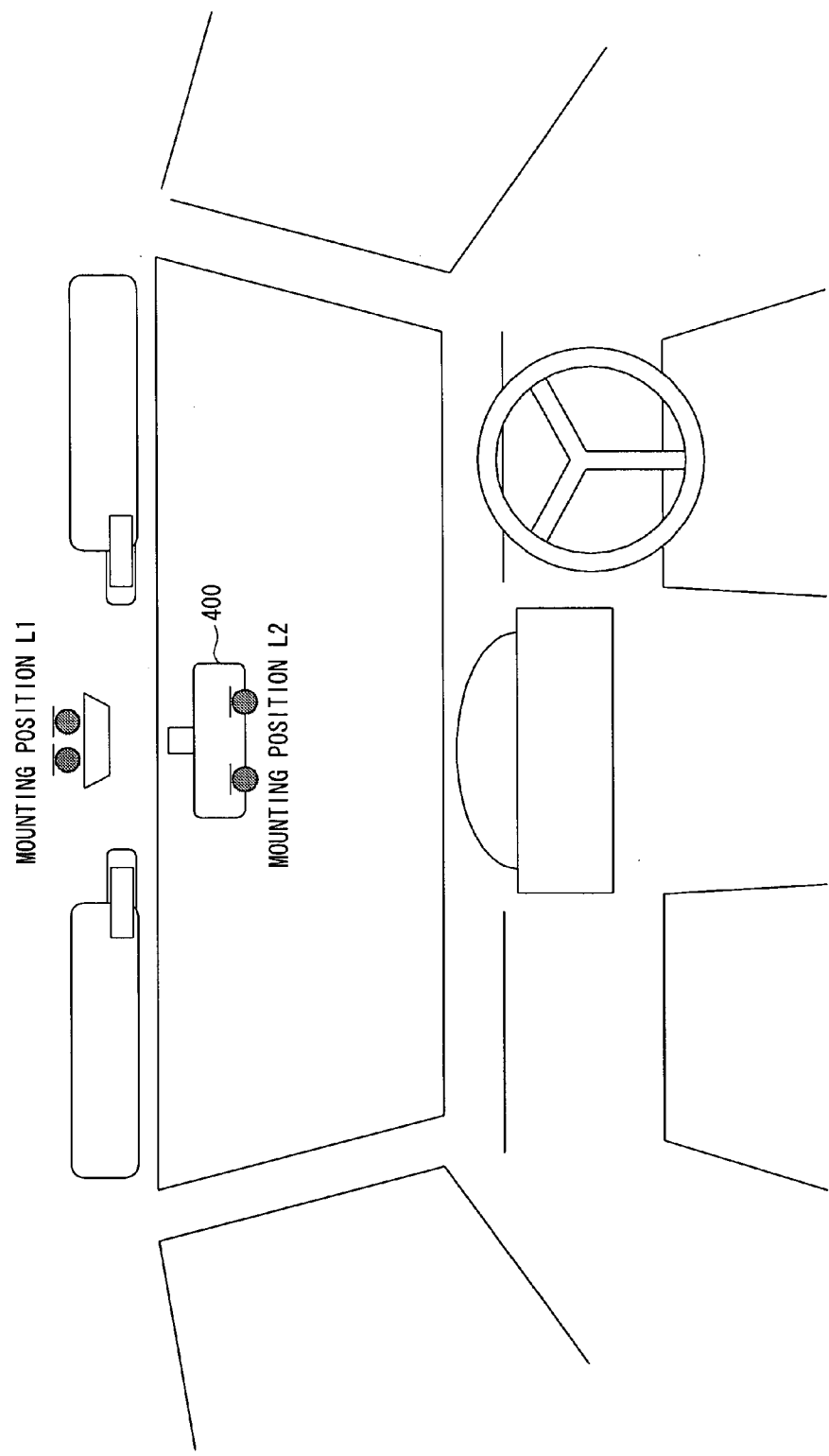

FIG. 15

- SPEAKER                              DUMMY HEAD
- SPEAKER'S FACE DIRECTION
    — DRIVER'S SEAT                   FRONT DIRECTION
    — PASSENGER'S SEAT                FRONT DIRECTION
- EVALUATION SPEECH DATA              128 CONTROL WORDS
                                      SPEECH SIMULTANEOUSLY SPOKEN IN DRIVER'S SEAT
                                      AND PASSENGER'S SEAT (EACH TWO PAIRS OF MALE
                                      AND FEMALE)
                                      TOTAL OF 12 PATTERN DATA

- VOCABULARY NETWORK                  128 WORDS PARALLEL NETWORK (WITH Garbage MODEL)
- SOUND SOURCE SEPARATION METHOD      TECHNIQUE OF THE PRESENT INVENTION
- SAMPLING FREQUENCY                  11.025kHz
- SPEECH RECOGNITION ACCURACY IS EVALUATED FOR EACH OF SEPARATED SPEECH SPOKEN
  IN DRIVER'S SEAT AND PASSENGER'S SEAT

FIG. 16A

|  |  | STOP STATE | RUNNING STATE | REMARKS |
|---|---|---|---|---|
| CONVENTIONAL METHOD 1 | SPEECH SIMULTANEOUSLY SPOKEN IN A CAR CABIN | 29% | 27% | TARGET IS ONE SPEAKER |
| CONVENTIONAL METHOD 2 | UPDATE OPTIMUM VALUE/EXTRACT TARGET SOUND | 36% | — | TECHNIQUE APPLICABLE TO A MOVABLE SOUND SOURCE |
| THE PRESENT TECHNIQUE | SPEECH AFTER SEPARATION PROCESSING BY PROPOSED METHOD | 78% | 78% |  |

FIG. 16B

|  |  | STOP STATE | REMARKS |
|---|---|---|---|
| CONVENTIONAL METHOD 1 | SPEECH SIMULTANEOUSLY SPOKEN IN A CAR CABIN | 93% | TARGET IS ONE SPEAKER |
| THE PRESENT TECHNIQUE | SPEECH AFTER SEPARATION PROCESSING BY PROPOSED METHOD | 0% |  |

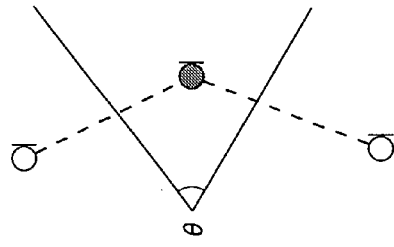
FIG. 35B
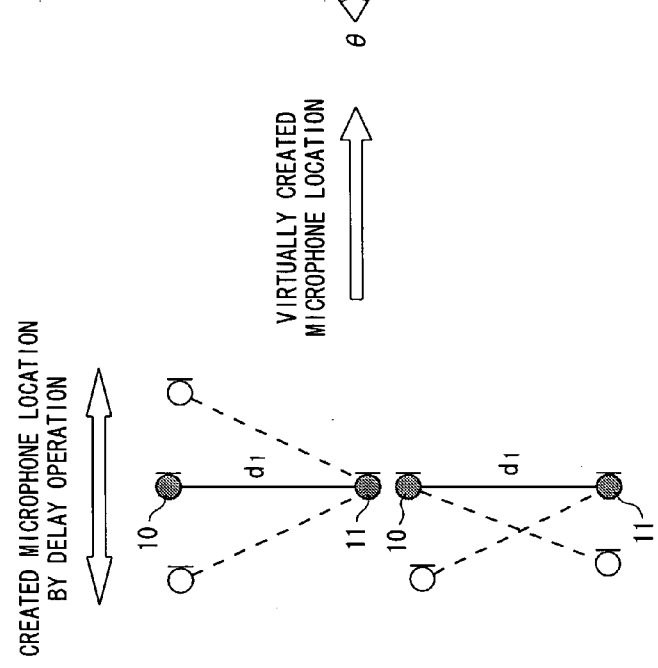
2-MICROPHONE CONFIGURATION
FIG. 35A
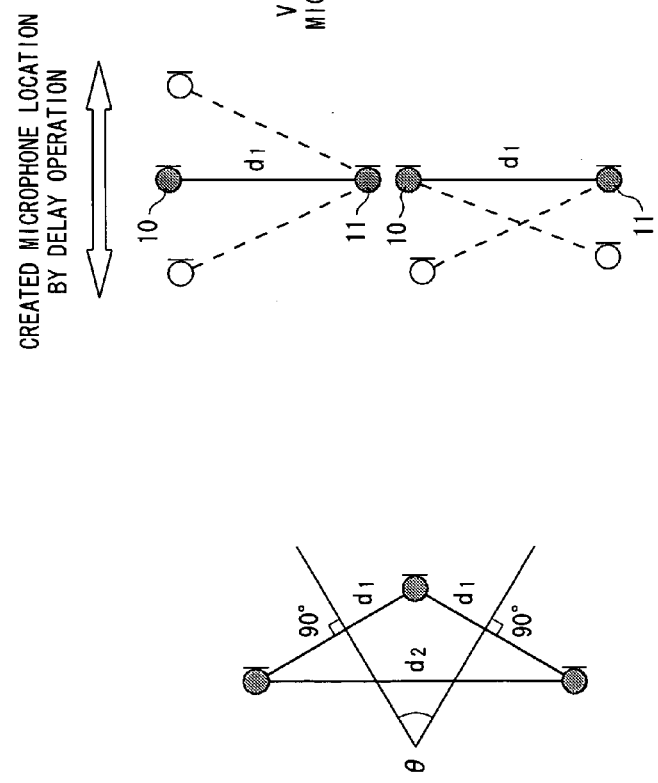
3-MICROPHONE CONFIGURATION

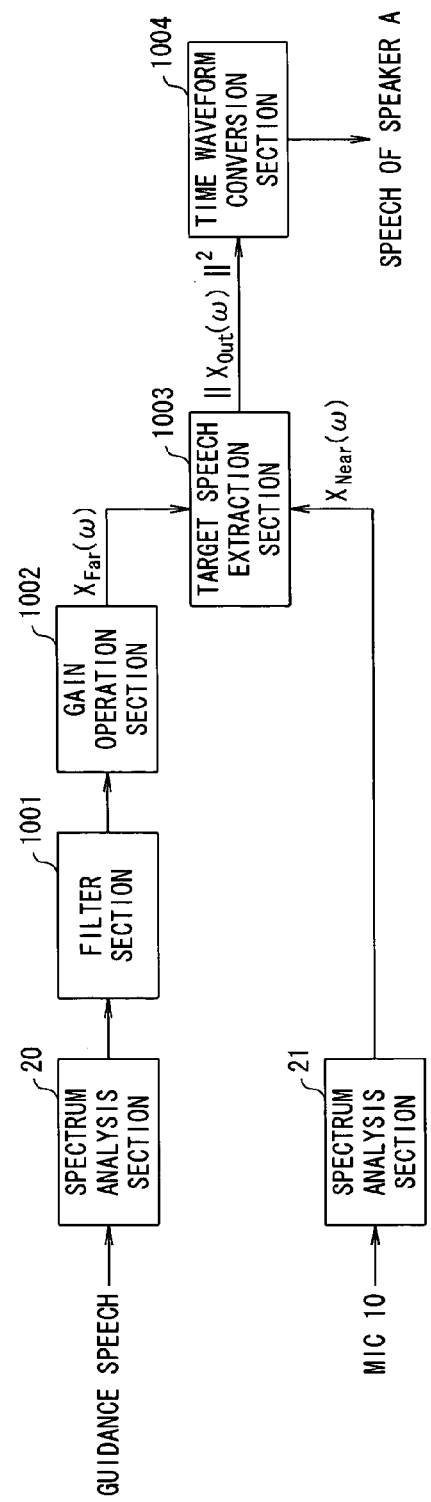

F I G. 4 6
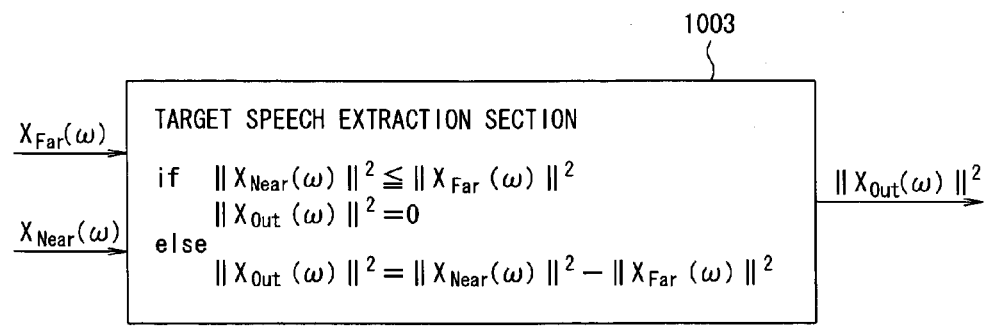

$th_{min}$ : THRESHOLD VALUE FOR DETERMINING THAT $X_{Far}(\omega)$ IS VALID INPUT

TECHNICAL FIELD

The present invention relates to a sound source separation device, a speech recognition device, a mobile telephone, a sound source separation method, and a program which uses a plurality of microphones and separates a sound source signal of a target sound source from a signal which consists of a plurality of acoustic signals emitted from a plurality of sound sources such as a plurality of speech signals and various background noises.

BACKGROUND ART

When a specific speech signal or the like is to be recorded under various environments, it is difficult to record only a signal of a target sound using a microphone since there are various noise sources in a peripheral environment, and therefore some sort of noise reduction processing or sound source separation processing is necessary.

As an example where such processing is especially needed, there is an automotive environment. Under an automotive environment, due to the spread of mobile phones, a microphone installed far from speaker's mouth in a car is typical situation of a telephone call using a mobile phone during driving, and thereby speech quality is significantly degraded. In addition, also when speech recognition is performed during driving under an automotive environment, because utterance is performed in similar condition, speech recognition performance is degraded. The current progress in speech recognition technology makes speech recognition much more robust against stationary noise than before. However, the current speech recognition technology has a problem of degradation of recognition performance when a plurality of speakers speaks simultaneously. Since the current speech recognition technology does not provide high speech recognition accuracy for a mixed simultaneous speech of two speakers, a passenger other than a speaker is not allowed to speak during the speech recognition device is used. Under this situation, behavior of the passenger is restricted. Although a principal independent component analysis method or the like have applied to separate such sound sources, it is not practical enough because of computational complexity, variations of the number of sound sources, and the like.

To solve the above described problems, various kinds of methods, which use a plurality of microphones installed in a car cabin and record only a speech from a certain direction, have been proposed. However, it is difficult to secure space for installing many microphones in a car cabin. Furthermore, it is also difficult to use microphones having uniform characteristics under the cost restriction. Therefore, a method is desired which allows the number of microphones to be as small as possible and uneven characteristic of the microphones.

Generally, when a plurality of microphones are used, the lower the cost of microphones, the larger the uneven sensitivity characteristics thereof, and it is said that uneven frequency characteristics is about ±3 dB. In processing of an addition type array such as a delay-and-sum array in microphone array technologies, these uneven characteristic only prevents microphone array performance to be achieved as designed. However, in a so-called subtraction type array such as an adaptive array, these uneven characteristic may degrade performance especially in low frequencies less than or equal to about 1 kHz compared to a case where one microphone is used.

Uneven characteristic of microphones as sensors are a critical problem for the microphone array technology. To solve this problem, methods for uniforming sensitivities of a plurality of microphone elements have been proposed in Patent Documents 1 to 5, etc.

Conventionally, as for a microphone array that utilizes an adaptive beamforming processing technology which has a great effect with a few number of microphones, various methods such as a generalized sidelobe canceller (GSC), a Frost type beamformer, and a reference signal method have been known as described in, for example, Non-Patent Documents 1 and 2.

The adaptive beamforming processing is basically a processing to suppress noise by a filter which forms a directional beam having a directional null (blind spot) in a direction of a noise source, and a generalized sidelobe canceller is known to have relatively high performance especially among them. However, the GSC has a problem that a target signal is suppressed and degraded when the target signal is arrived from a direction different from a direction of a specified target signal source. To deal with this problem, Patent Documents 6 and 7 discloses a method which performs processing in a frequency domain so that a computational complexity is reduced, and a direction of a speaker and a direction of a specific noise are successively detected by using filter coefficients in the frequency domain, a target sound is separated from a noise other than the target sound to some extent, and spectral subtraction is applied as well, so that a noise from unknown arrival direction and a diffuse noise are reduced.

[Patent Document 1] JP5-131866A
[Patent Document 2] JP2002-99297A
[Patent Document 3] JP2003-153372A
[Patent Document 4] JP2004-343700A
[Patent Document 5] JP2004-289762A
[Patent Document 6] JP2001-100800A
[Patent Document 7] JP2000-47699A
[Non-Patent Document 1] The Institute of Electronics, Information and Communication Engineers, "Acoustic Systems and Digital Processing"
[Non-Patent Document 2] HAykin, "ADAptive Filter Theory (Prentice HAll)"

DISCLOSURE OF THE INVENTION

In the technology which combines the adaptive beamformer with the spectral subtraction as described in the Patent Documents 6 and 7, a reference signal, which is a suppressed target sound, needs to be generated as an input signal of an adaptive filter section. If there is an uneven sensitivity of microphone elements, the target sound cannot be sufficiently suppressed and thus the target sound is contained in both the reference signal and a target signal in the adaptive filter section. Therefore the target sound is distorted and quality of the sound is degraded as a result of application of adaptive filter processing. Also in a closed space where an initial reflection is strong, a target sound is leaked into a reference signal so that the similar phenomenon occurs.

To solve this problem, there is a method of compensating sensitivity of microphone elements, which measures a uneven characteristic of microphone elements in assembly process to generate data for compensation, and compensates the characteristic based on the data when the microphone elements are used, or which calibrates individual differences of sensitivities of microphone elements and successive changes caused by aging change of components or peripheral temperature using a reference signal from a specific direction while in use. However, there are problems about increase of production cost, when a reference signal should be played, how to determine whether or not a recorded signal contains only a reference signal, and so on.

Paying attention to operation of an adaptive filter, in general, if there is a high correlation between a reference signal and a target signal, estimation process of the adaptive filter cannot perform well and thereby estimation accuracy is significantly degraded. As an example, there is a case where a target sound and a noise are both speech signals.

A similar problem occurs in an echo canceller, and in an adaptive filter which estimates an echo mixed from a far-end signal into a near-end signal, when two persons speak simultaneously at far and near ends, a so-called double-talk state occurs and thereby performance of the echo canceller is degraded. Therefore, it is an important condition to maintain the performance how precise a double-talk state is detected in order to stop parameter estimation of an adaptive filter or slow down the speed of the estimation.

Therefore, also in the case of the adaptive filter, if a target sound and a specific noise are both speech, a state in which the both are speaking needs to be detected. The more frequent this state is, the more frequent adaptive filter estimation is stopped. As a result, there is a problem that noise reduction performance of the adaptive filter is degraded.

Further, in a situation where a large diffuse noise such as a noise of a running car is generated, estimation accuracy of the adaptive filter is degraded due to the diffuse noise. And as a result, filter parameter estimated by adaptive filter degrades an estimation accuracy of arrival direction of a speaker and a specific noise, and thus overall system performance is degraded.

In addition, in the case that the above method described in the Patent Documents 6 and 7 is applied to a noise component suppression device using a low-cost microphone for an automobile or the like, a desired operation cannot be achieved as an entire device if an initial reflections of a sound source in a car cabin is strong, a diffuse noise component is large, an uneven characteristic of used microphone elements is large (about ±3 db), and a target signal and a specific noise are generated simultaneously and their correlation is high because a driver and a passenger speak simultaneously, or so on.

The present invention is made in view of the above described problems, and is intended to provide a sound source separation device, a speech recognition device, a mobile telephone, a sound source separation method, and a program which allow to separate a sound source signal of a target sound source from a mixed sound which includes sound source signals emitted from a plurality of sound sources without being affected by uneven sensitivity of microphone elements.

To solve the above described problems, the invention provides a sound source separation device for separating a sound source signal of a target sound source from a mixed sound which includes sound source signals emitted from a plurality of sound sources using at least two microphones arranged separately from each other comprising: beamforming means for performing a first beamforming processing to attenuate a sound source signal arriving from a predetermined direction by performing computations using first coefficients on an output signal of said microphones, and performing a second beamforming processing to attenuate a sound source signal arriving from a direction symmetrical to said predetermined direction with respect to a perpendicular line to a straight line connecting the two microphones by performing computations using second coefficients which are complex conjugate of said first coefficients in a frequency domain on the output signal of said microphones; power computation means for computing power spectrum information with respect to each of sound source signals obtained by said beamforming means; and target sound spectrum extraction means for extracting spectrum information of a target sound source based on a difference between the power spectrum information calculated by said power computation means.

According to this invention, the sound source separation device provides a directional characteristics which is not affected by sensitivities of microphone elements, and allows to separate a sound source signal of a target sound source from a mixed sound which includes sound source signals emitted from a plurality of sound sources without being affected by uneven sensitivity of the microphone elements.

The invention also includes the sound source separation device, wherein said beamforming means applies said first beamforming processing and said second beamforming processing to each of a combination of any two microphones among three microphones which arranged separately from each other and another combination of two microphones among said three microphones.

According to this invention, a sound source signal from a target sound source which locates in each area whose boundary is a perpendicular line to a straight line connecting two microphones among three microphones.

The invention also includes the sound source separation device, further comprising directional characteristics control means for applying a delay to an output signal of a microphone.

According to this invention, directional characteristics can be compensated to its optimum condition by applying a delay, and separation performance of sound sources can be improved.

The invention also includes the sound source separation device, wherein said directional characteristics control means virtually generates output signals of three microphones by applying a delay to an output signal of at least one microphone among two microphones.

According to this invention, since output signals from three microphones can be virtually generated, a sound source signal arriving from a direction of a perpendicular line to a straight line connecting two microphones can be separated and extracted using only the two microphones.

The invention also includes the sound source separation device, further comprising arrival direction estimating means for estimating a arrival direction of said sound source signal, wherein said directional characteristics control means applies a delay to an output signal of the microphone such that two sound sources virtually locate symmetrically with respect to a perpendicular line to a straight line connecting the two microphones based on an arrival direction estimated by said arrival direction estimating means.

According to this invention, delay operation can be performed such that high separation performance of sound sources is obtained.

The invention also includes the sound source separation device, further comprising spectral subtraction means for performing spectral subtraction processing on the power spectrum information extracted by said target sound extraction means.

According to this invention, a stationary noise whose arrival direction is unknown, a diffuse noise, and the like can be suppressed by performing the spectral subtraction processing.

The invention also includes the sound source separation device, further comprising stationary noise reduction means for performing processing to reduce noise before the processing by said beamforming means is performed.

According to this invention, generation of a perceptually unpleasant noise such as a musical noise can be reduced.

The invention also provides a speech recognition device comprising speech recognition means for performing speech recognition of a sound source signal separated by the sound source separation device.

According to this invention, highly accurate speech recognition can be performed based on a separated sound source signal with high accuracy.

The invention also includes the speech recognition device, further comprising recognition vocabulary list storage means for storing a driver's seat side recognition vocabulary list which is a list of candidates of vocabulary spoken from a drivers seat side of a vehicle and a passenger's seat side recognition vocabulary list which is a list of candidates of vocabulary spoken from a passenger's seat side, wherein said speech recognition means performs speech recognition processing of a sound source signal separated by said sound source separation device based on the driver's seat side recognition vocabulary list and the passenger's seat side recognition vocabulary list stored in said recognition vocabulary list storage means.

According to this invention, since the speech recognition device performs speech recognition processing based on the passenger's seat side recognition vocabulary list and the driver's seat side recognition vocabulary list stored in the recognition vocabulary list storage means, an optimal vocabulary item can be selected from a vocabulary list separately between a driver's seat side and a passenger's seat side so that accurate speech recognition can be performed.

The invention also includes the speech recognition device, further comprising: state transition means for managing a current state of a vehicle; valid vocabulary list storage means for storing a valid vocabulary list of the passenger's seat side and the driver's seat side depending on a state of the vehicle; and control means for determining whether a vocabulary item recognized by said speech recognition means is valid or not based on the current state of the vehicle managed by said state transition means and the vocabulary list stored in said valid vocabulary list storage means, and controlling depending on the determination result.

According to this invention, control contributes to the comforts of persons in vehicle because validness of recognized vocabulary item can be determined based on a current state of a vehicle and a valid vocabulary list, and control can be performed depending on the determination result. In addition, a valid vocabulary list and contents of control can be designed freely so that flexibility can be given to application design using speech recognition.

The invention also provides a mobile phone comprising the sound source separation device.

According to this invention, a mobile phone can be used as a sound collecting microphone in a medium sized conference room and the like.

The invention also provides a sound source separation method comprising: a sound source signal receiving step of inputting sound source signals emitted from a plurality of sound sources to at least two microphones arranged separately from each other; a beamforming processing step of performing a first beamforming processing and a second beamforming processing to attenuate sound source signals arriving from predetermined directions symmetrical with respect to a perpendicular line to a straight line connecting two microphones respectively by performing computations using two weighted coefficients which are complex conjugate to each other in a frequency domain on an output signal of said microphone respectively; a power computation step of computing power spectrum information with respect to each of sound source signals obtained in said beamforming processing step; and a target sound spectrum extracting step of extracting spectrum information of a target sound source based on a difference between the power spectrum information calculated in said power computation step.

An invention also provides a program for causing a computer to perform: an output signal acquisition step of acquiring an output signal which includes sound source signals emitted from a plurality of sound sources are mixed from at least two microphones arranged separately from each other; a beamforming processing step of performing a first beamforming processing and a second beamforming processing to attenuate sound source signals arriving from predetermined directions symmetrical with respect to a perpendicular line to a straight line connecting two microphones respectively by performing computations using two weighted coefficients which are complex conjugate to each other in a frequency domain on the output signal acquired in said output signal acquisition step respectively; a power computation step of computing power spectrum information with respect to each of sound source signals obtained in said beamforming processing step; and a target sound spectrum extracting step of extracting spectrum information of a target sound source based on a difference between the power spectrum information calculated in said power computation step.

According to the present invention, a first beamforming processing and a second beamforming processing are performed for attenuating sound source signals arriving from predetermined directions symmetrical with respect to a perpendicular line to a straight line connecting two microphones respectively by performing operations using two weighted coefficients which are complex conjugate to each other in a frequency domain, thereby the sound source signals arriving from the predetermined directions symmetrical with respect to the perpendicular line to the straight line connecting two the microphones respectively are attenuated, and spectrum information of a target sound source is extracted based on a difference between respective power spectrum information of sound source signals obtained by the first beamforming processing and the second beamforming processing. Therefore, a directional characteristics which is not affected by sensitivity of microphone elements can be achieved, and a sound source signal from a target sound source can be separated from a mixed sound which contains sound source signals emitted from a plurality of sound sources without being affected by uneven sensitivity of the microphone elements.

BRIEF DESCRIPTION OF THE DRAWINGS

FIG. 10 is a diagram which shows directional characteristics of a single beamformer when a difference of sensitivity of microphone elements is varied according to the embodiment;

FIG. 11 is a diagram which shows a 360-degree directional characteristic of the sound source separation device according to the embodiment;

FIG. 14 is a diagram which shows mounting positions of microphones in an evaluation experiment according to the embodiment;

FIG. 15 is a diagram which shows conditions of the evaluation experiment according to the embodiment;

FIGS. 16A and 16B are diagrams which show a result of the evaluation experiment according to the embodiment;

FIGS. 35A and 35B are diagrams for describing a delay operation according to the embodiment;

FIG. 45 is a diagram which shows a configuration of a guidance speech elimination section according to the embodiment;

FIG. 46 is a diagram which shows a configuration of a target speech extraction section according to the embodiment;

BEST MODE FOR CARRYING OUT THE INVENTION

Hereinafter, embodiments according to the present invention will be described with reference to the drawings.

First Embodiment

Figure 1:
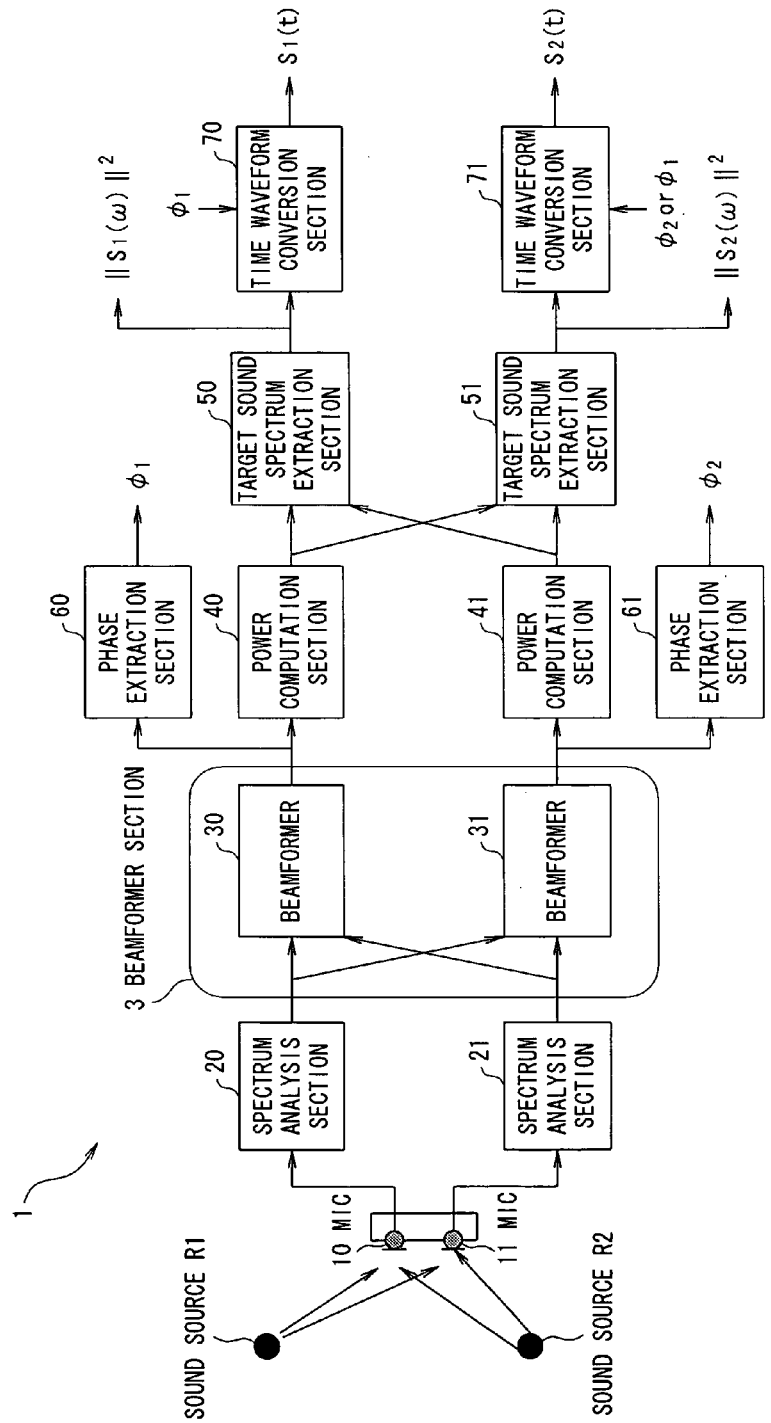
FIG. 1 is a diagram which shows a basic configuration of a sound source separation system according to a first embodiment of the present invention.

FIG. 1 is a diagram which shows a basic configuration of a sound source separation system according to the first embodiment of the present invention. This system is comprised of two microphones (hereinafter referred to as MIC) 10, 11 and a sound source separation device 1. This sound source separation device 1 includes a CPU that performs overall control and arithmetic processing, hardware including storage devices a ROM, a RAM, and a hard disk device, and software including a program, data, and the like stored in the storage devices, which are not shown. Function blocks shown in FIG. 1 are implemented by these hardware and software.

Figure 2:
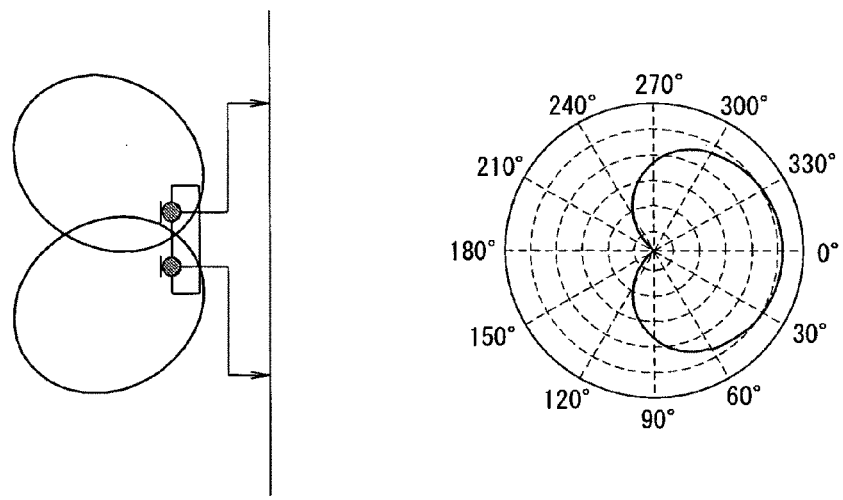
FIG. 2 is a diagram which shows one example of a type of microphone according to the embodiment.

The two MICs 10 and 11 are non-directional MICs and arranged separately by a few centimeters from each other on a plane. Although the MICs 10 and 11 are basically omnidirectional, unidirectional microphones may be used as shown in FIG. 2. The MICs 10 and 11 receive signals emitted from two sound sources R1 and R2. At this time, these two sound sources R1 and R2 locate in two areas divided by a perpendicular line to a straight line connecting the two MICs 10 and 11 as a boundary (hereinafter referred to as "left and right of a perpendicular line") respectively, but their location do not have to be symmetrical with respect to the perpendicular line.

Frequency analysis is performed for each output of the MICs 10 and 11 which pick up two sound source signals by spectrum analysis sections 20 and 21. The frequency-analyzed sound source signals is filtered by beamformers 30 and 31 which form symmetrical directional nulls in the left and right of the perpendicular line to the straight line connecting the two MICs 10 and 11 in the beamformer section 3. Power of the filer output is computed by power computation sections 40 and 41. And processing is performed by target sound spectrum extraction sections 50 and 51 such that respective differences are computed, and a computed result value is outputted if the value is grater than or equal to a certain value, and if not, the value is set to zero. These processings differs from common processing for forming a directional null for a specific noise, and configures the beamformer section 3 under some conditions and performs the above described processings, so that the conventional problem of degradation of characteristics of a microphone array due to uneven sensitivity of microphone elements can be solved, and a directional characteristic which separates sounds from left and right with respect to the perpendicular line as described above can be achieved for a broad frequency band. Each functional block will be described in detail below.

<Beamformer Section>

Figure 3:
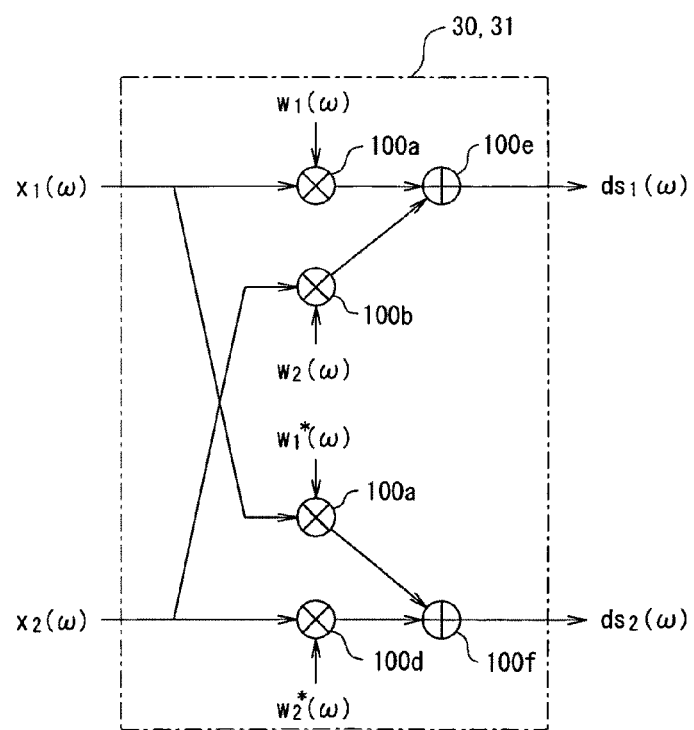
FIG. 3 is a diagram which shows a configuration of a beamformer section according to the embodiment.

First, a configuration of the beamformer section 3 will be described with reference to FIG. 3. In FIG. 3, signals $x_1(\omega)$ and $x_2(\omega)$ which are decomposed for each frequency component by spectrum analysis sections 20 and 21 are inputted, and are multiplied by weighted coefficients of filter $w_1(\omega)$, $w_2(\omega)$, $w_1^*(\omega)$, $w_2^*(\omega)$ (*indicates complex conjugate) respectively by multipliers 100a, 100b, 100c and 100d. And two multiplication results are added by adders 100e and 100f, and filtering processing results $ds_1(\omega)$, $ds_2(\omega)$ are outputted as outputs of them. In this way, the beamformer section 3 forms directional nulls in symmetrical positions with respect to a perpendicular line to a straight line connecting the MICs 10 and 11 by using complex conjugate filter coefficients.

<Power Computation Section>

Figure 4:
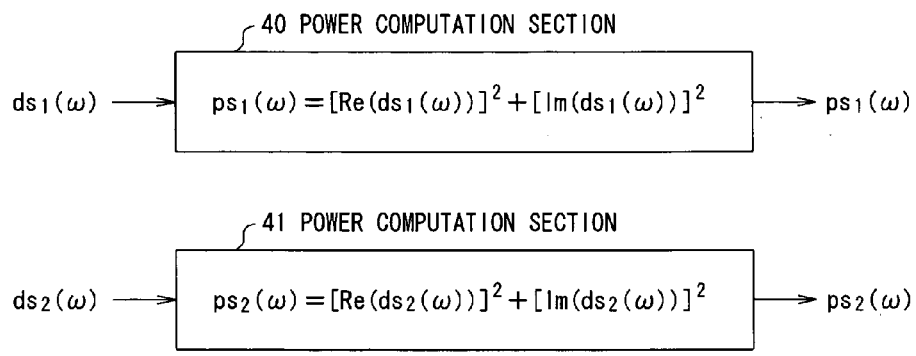
FIG. 4 is a diagram which shows a configuration of a power computation section according to the embodiment.

Next, power computation sections 40 and 41 will be described with reference to FIG. 4. The power computation sections 40 and 41 convert outputs $ds_1(\omega)$ and $ds_2(\omega)$ from the beamformer 30 and the beamformer 31 to power spectrum information $ps_1(\omega)$ and $ps_2(\omega)$ by the following calculating equations.

$$ps_1(\omega)=[Re(ds_1(\omega))]^2+[Im(ds_1(\omega))]^2$$

$$s_2(\omega)=[Re(ds_2(\omega))]^2+[Im(ds_2(\omega))]^2$$

<Target Sound Spectrum Extraction Section>

Figure 5:
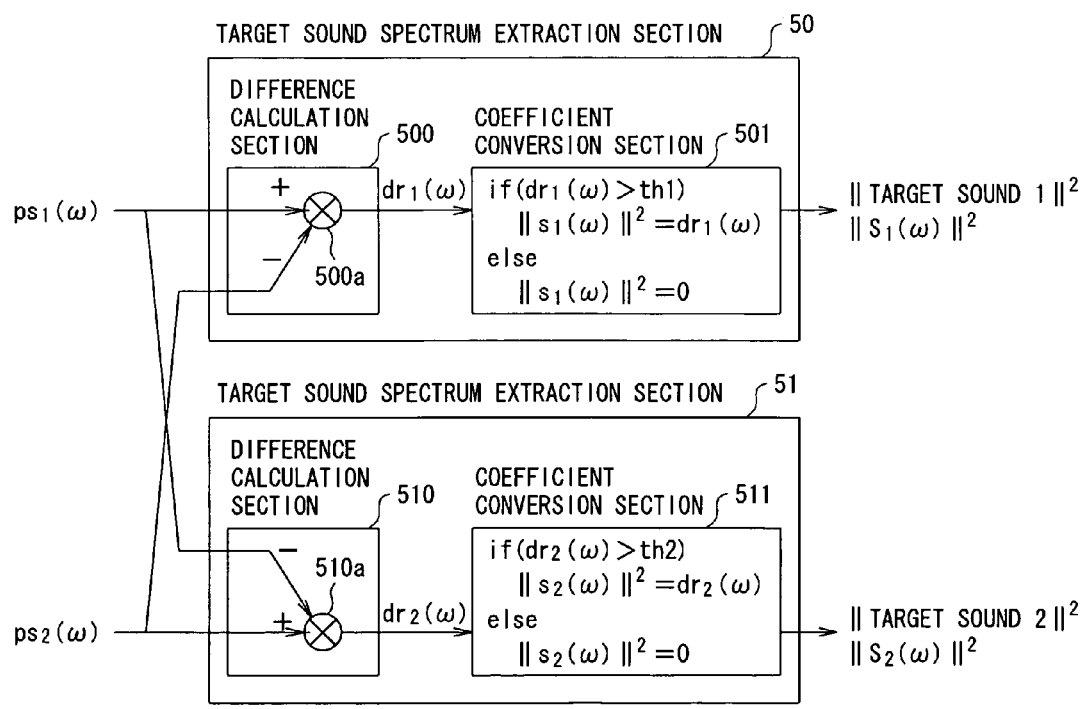
FIG. 5 is a diagram which shows a configuration of a target sound spectrum extraction section according to the embodiment.

Next, the target sound spectrum extraction sections 50 and 51 will be described with reference to FIG. 5. $ps_1(\omega)$ and $ps_2(\omega)$, which are outputs of the power computation sections 40 and 41, are used as two inputs to the target sound spectrum extraction sections 50 and 51. The target sound spectrum extraction sections 50 and 51 receive power spectrum information outputted from the two beamformers 30 and 31 as inputs, and output left and right target sounds as outputs respectively. The target sound spectrum extraction sections 50 and 51 are internally composed of difference calculation sections 500 and 510 and coefficient conversion sections 501 and 511.

The difference calculation section 500 subtracts power spectrum information of the beamformer 31 from that of the beamformer 30 in the subtractor 500a, and similarly the difference calculation section 510 subtracts power spectrum information of the beamformer 30 from that of the beamformer 31 in the subtractor 510a, and their results are then inputted to the coefficient conversion sections 501 and 511 respectively. The coefficient conversion sections 501 and 511 are blocks for separating left and right sounds respectively. The coefficient conversion sections 501 and 511 output spectrum information that are values greater than or equal to certain threshold values as signals from target directions respectively. Although a threshold value is typically "0" as used herein, an optimum threshold value may be obtained by actual measurement and individually set depending on a use environment.

<Operation>

Next, operation of the entire sound source separation device system will be described with reference to FIG. 1.

Firstly, two omnidirectional or directional MICs 10 and 11 are arranged separately by a few centimeters from each other, and signals emitted from two sound sources are received by the MICs 10 and 11. Then, each of mixed signals of two sound source signals received by the MICs 10 and 11 are frequency-analyzed by the spectrum analysis sections 20 and 21. Although a generally used technique such as fast Fourier transform is used here, it may be a spectrum analysis technique such as filter bank. Spectrum analysis processing is performed every fixed period of about 10 msec.

The spectrum-analyzed two signals are filtered by the beamformers 30 and 31 in which directional nulls are formed symmetrically with respect to the perpendicular line to the straight line connecting the MICs 10 and 11, so that a signal from a specific direction is attenuated. However, in this case, it is not intended to precisely estimate an arrival direction of specific sound source and direct a directional null to the precisely estimated sound source direction. This filtering using inputs of two channels are performed for each frequency component, and outputs of the beamformers 30 and 31 are converted to spectrum power information by the power computation sections 40 and 41, at the same time phase information $\Phi_1$ and $\Phi_2$ are extracted from the outputs of the beamformers 30 and 31 by a phase extraction sections 60 and

61. Then, the outputs of the beamformers 30 and 31 which have been converted to the spectrum power information by the power calculation sections 40 and 41 are sent to the target sound spectrum extraction sections 50 and 51. Then power spectrum information of a sound source signal coming from right direction (0 degree to 90 degrees) is extracted by the target sound spectrum extraction section 50, power spectrum information of a sound source signal coming from left direction (−90 degrees to 0 degree) is extracted by the target sound spectrum extraction section 51.

In a case the power spectrum information extracted by the target sound spectrum extraction section 51 is used as pre-processing of speech recognition processing, the relevant power spectrum information is sent to an acoustic parameter analysis section (not shown) in which acoustic analysis processing is performed on the power spectrum information. On the other hand, when the extracted power spectrum information of the sound source signals needs to be converted back to time signal, the phase information extracted by the phase extraction sections 60 and 61 and the spectrum information extracted by the target sound spectrum extraction sections 50 and 51 are inputted to a time waveform conversion sections 70 and 71 to be converted back to time signal information.

<Design Example of Null Beamformer>

In the following, it will be proved that, if directional nulls in symmetrical positions with respect to the perpendicular line to the straight line connecting the two MICs 10 and 11 are formed in the beamformers 30 and 31 in the beamformer section 3, a directional characteristic (directivity) is not affected by sensitivity of microphone elements.

Figure 6:
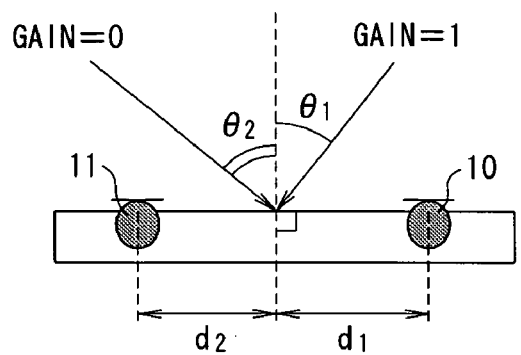
FIG. 6 is a diagram for describing a null beamformer according to the embodiment.

In a case where two microphone elements are used, as shown in FIG. 6, a design example of a null beamformer in which a gain for a target direction $\theta_1$ is 1 and one directional null (gain 0) is formed in another direction $\theta_2$ will be described below.

When an output signal of the null beamformer is $S(f)=[s_1(f), s_2(f)]'$, and an observed signal is $X(f)=[x_1(f), x_2(f)]'$, $W(f, \theta_1, \theta_2)=[w_1(f), w_2(f)]'$ which is a weighted coefficients vector of the null beamformer at a given frequency f (where ' denotes transposition operation) can be obtained by the following calculation.

$$S(f, \theta_1, \theta_2) = W(f, \theta_1, \theta_2) X(f, \theta_1, \theta_2) \quad \langle \text{Equation 1} \rangle$$

$$W(f, \theta_1, \theta_2) = \begin{bmatrix} w_1(f, \theta_1, \theta_2) \\ w_2(f, \theta_1, \theta_2) \end{bmatrix}$$

then, $$\begin{bmatrix} 1 \\ 0 \end{bmatrix} = \begin{bmatrix} \exp[j2\pi f d_1 \sin\theta_1 / c]\exp[j2\pi f d_2 \sin\theta_1 / c] \\ \exp[j2\pi f d_1 \sin\theta_2 / c]\exp[j2\pi f d_2 \sin\theta_2 / c] \end{bmatrix} \begin{bmatrix} w_1(f, \theta_1, \theta_2) \\ w_2(f, \theta_1, \theta_2) \end{bmatrix}$$

$$\begin{bmatrix} w_1(f, \theta_1, \theta_2) \\ w_2(f, \theta_1, \theta_2) \end{bmatrix} = \begin{bmatrix} \exp[j2\pi f d_1 \sin\theta_1 / c]\exp[j2\pi f d_2 \sin\theta_1 / c] \\ \exp[j2\pi f d_1 \sin\theta_2 / c]\exp[j2\pi f d_2 \sin\theta_2 / c] \end{bmatrix}^{-1} \begin{bmatrix} 1 \\ 0 \end{bmatrix}$$

Figure 7:
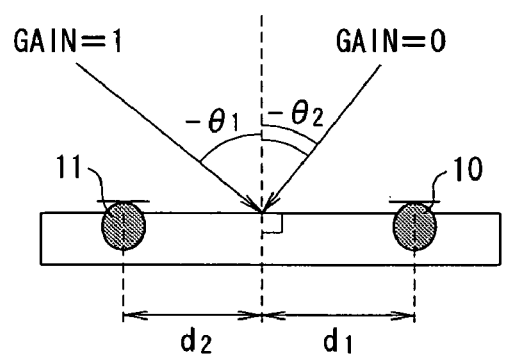
FIG. 7 is a diagram for describing the null beamformer according to the embodiment.

On the other hand, as shown in FIG. 7, when a target direction and a null direction are set in directions line-symmetrical to the positions shown in FIG. 6 with respect to the perpendicular line to the straight line connecting the two MICs 10 and 11, a weighted coefficients vector $W(f, -\theta_1, -\theta_2)=[w_1(f), w_2(f)]'$ can be obtained by the following calculation.

$$S(f, -\theta_1, -\theta_2) = W(f, -\theta_1, -\theta_2) X(f, -\theta_1, -\theta_2) \quad \langle \text{Equation 2} \rangle$$

$$W(f, -\theta_1, -\theta_2) = \begin{bmatrix} w_1(f, -\theta_1, -\theta_2) \\ w_2(f, -\theta_1, -\theta_2) \end{bmatrix}$$

Then, $$\begin{bmatrix} 1 \\ 0 \end{bmatrix} = \begin{bmatrix} \exp[-j2\pi f d_1 \sin\theta_1 / c]\exp[-j2\pi f d_2 \sin\theta_1 / c] \\ \exp[-j2\pi f d_1 \sin\theta_2 / c]\exp[-j2\pi f d_2 \sin\theta_2 / c] \end{bmatrix} \quad \langle \text{Equation 3} \rangle$$

$$\begin{bmatrix} w_1(f, \theta_1, \theta_2) \\ w_2(f, \theta_1, \theta_2) \end{bmatrix}$$

$$\begin{bmatrix} w_1(f, \theta_1, \theta_2) \\ w_2(f, \theta_1, \theta_2) \end{bmatrix} = \begin{bmatrix} \exp[-j2\pi f d_1 \sin\theta_1 / c]\exp[-j2\pi f d_2 \sin\theta_1 / c] \\ \exp[-j2\pi f d_1 \sin\theta_2 / c]\exp[-j2\pi f d_2 \sin\theta_2 / c] \end{bmatrix}^{-1} \begin{bmatrix} 1 \\ 0 \end{bmatrix}$$

is calculated. A relationship between the two weighted coefficients vectors is:

$$\begin{bmatrix} w_1(f, -\theta_1, -\theta_2) \\ w_2(f, -\theta_1, -\theta_2) \end{bmatrix} = \begin{bmatrix} w_1(f, \theta_1, \theta_2) \\ w_2(f, \theta_1, \theta_2) \end{bmatrix}^* \quad \langle \text{Equation 4} \rangle$$

and therefore respective weighted coefficients have complex conjugate relationship.

Next, a directional characteristic is derived in the power computation sections 40 and 41 and the target sound spectrum extraction sections 50 and 51. For calculation of the directional characteristic, weight vector W and directional vector V are defined by the following expressions.

$$W = \begin{bmatrix} w_1 \\ w_2 \end{bmatrix}, V = \begin{bmatrix} v_1 \\ v_2 \end{bmatrix} \quad \langle \text{Equation 5} \rangle$$

Then, directional characteristic of an output of the power computation section 40 $ps_1(\omega)$ and an output of the power computation section 41 $ps_2(\omega)$ can be expressed as follows.

$$ps_1(\omega) = [V^T W^*][V^T W^*]^H = V^T W^* W^T V^*$$

$$ps_2(\omega) = [V^T (W^*)^*][V^T (W^*)^*]^H = V^T W W^H V^* \quad <\text{Equation 6}>$$

where * denotes conjugate operation and H denotes conjugate transposition operation. Therefore, $dr_1(\omega)$ which is an output of the difference calculation section 500 in the target sound spectrum extraction section 50 can be obtained as follows.

$$dr_1(\omega) = V^T W^* W^T V^* - V^T W W^H V^* \quad \langle \text{Equation 7} \rangle$$

$$= V^T (W^* W^T - W W^H) V^*$$

$$= 2 \times \text{Re}[w_1^* w_2 v_1 v_2^*] - 2 \times \text{Re}[w_1 w_2^* v_1 v_2^*]$$

Now, α is introduced as a parameter representing an uneven sensitivity of MIC elements, and a sensitivity of one MIC element is assumed to be α times of that of the other MIC element. In this case, the fact that output of one MIC is α times of output of the other MIC is equivalent to the fact that weight multiplied to one channel is α times of that to the other channel. Accordingly, assuming $w_2 = \alpha w_{org2}$ in consideration of an uneven sensitivity of MIC elements, $$dr_1(\omega) = \alpha\{2 \times Re[w_1^* w_{org2} v_1 v_2^*] - 2 \times Re[w_1^* w_{org2}^* v_1 v_2^*]\}$$ <Equation 8>

Thus, a directional characteristic is not changed even if a sensitivity of microphone element is changed.

Then, if a sound source is sufficiently away from a MIC, i.e., in case of a plane wave, the direction vector V is expressed as:

$$V = \begin{bmatrix} v_1 \\ v_2 \end{bmatrix} = \begin{bmatrix} 1 \\ \exp\left(-j\frac{2\pi}{\lambda}d\sin\theta\right) \end{bmatrix}$$ <Equation 9>

As a result, $$dr(\omega)_1 = \alpha \left\{ \begin{array}{l} 2 \times Re\left[w_1^* w_{org2} \exp\left(j\frac{2\pi}{\lambda}d\sin\theta\right)\right] - \\ 2 \times Re\left[w_1^* w_{org2}^* \exp\left(j\frac{2\pi}{\lambda}d\sin\theta\right)\right] \end{array} \right\}$$ <Equation 10>

However, the above described technique retains a similar characteristic also in the case of a spherical wave.

Figure 8:
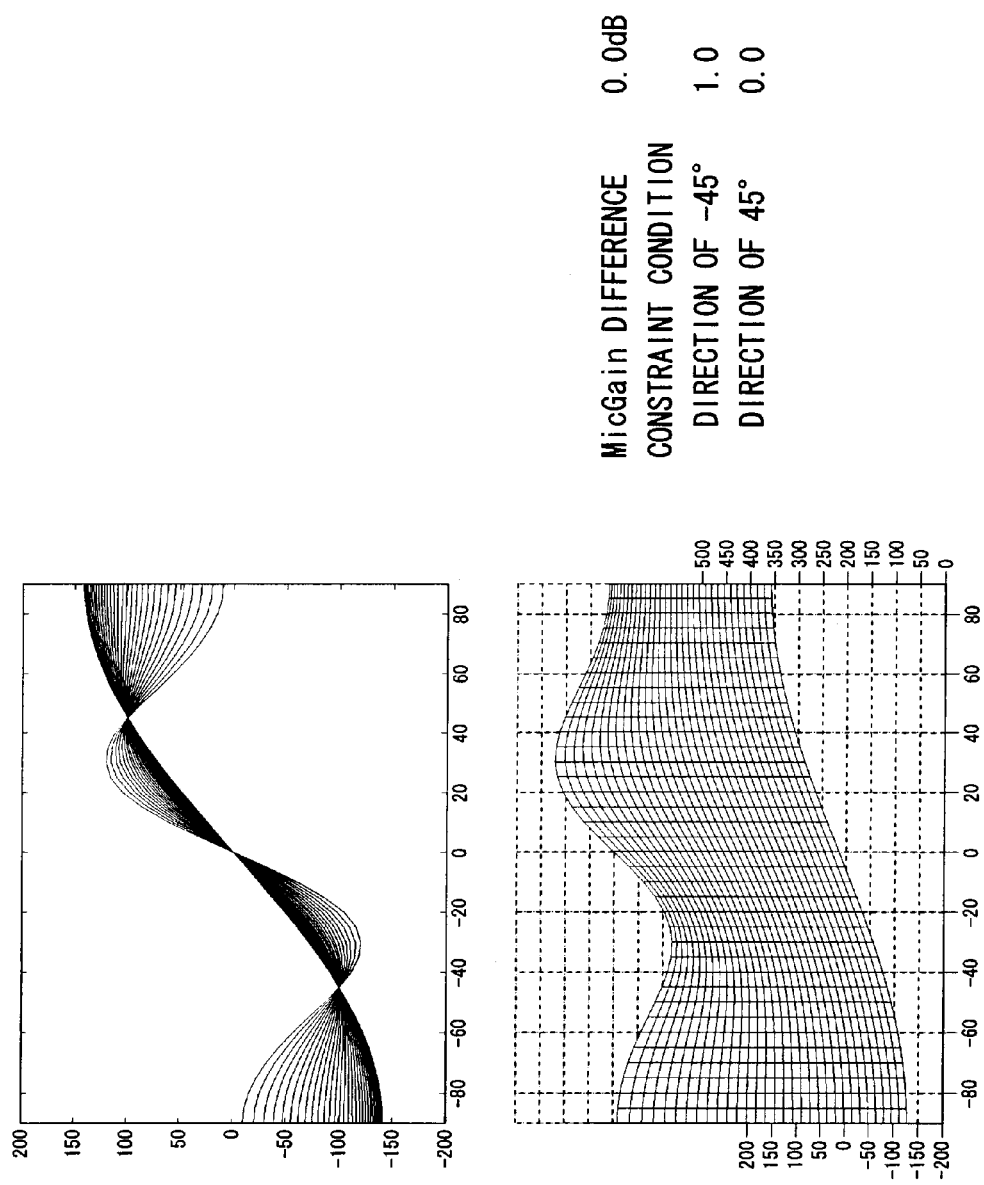
FIG. 8 is a diagram which shows one example of a directional characteristic of a difference result according to the embodiment.

FIG. 8 is an example of a directional characteristic of a difference result in a design in which, when a directional null is formed in direction of ±45 degrees from the perpendicular line as described above, constrains for maintaining gains of the beamformers 30 and 31 are specified in symmetrical positions (±45 degrees) with respect to the perpendicular line. As can be seen from FIG. 8, with the boundary in 0 degree direction, a sound source signal coming from right direction (right direction when viewed from the MICs 10 and 11 to the sound sources R1 and R2, hereinafter it is referred in the same manner) (0 degree to 90 degrees) has a positive value, and sound source signal coming from a left direction (−90 degrees to 0 degree) has a negative value. Thereby, whether an arrival direction is left or right can be determined for each of frequency components.

<Experiment Result of Directional Characteristics>

Figure 9:
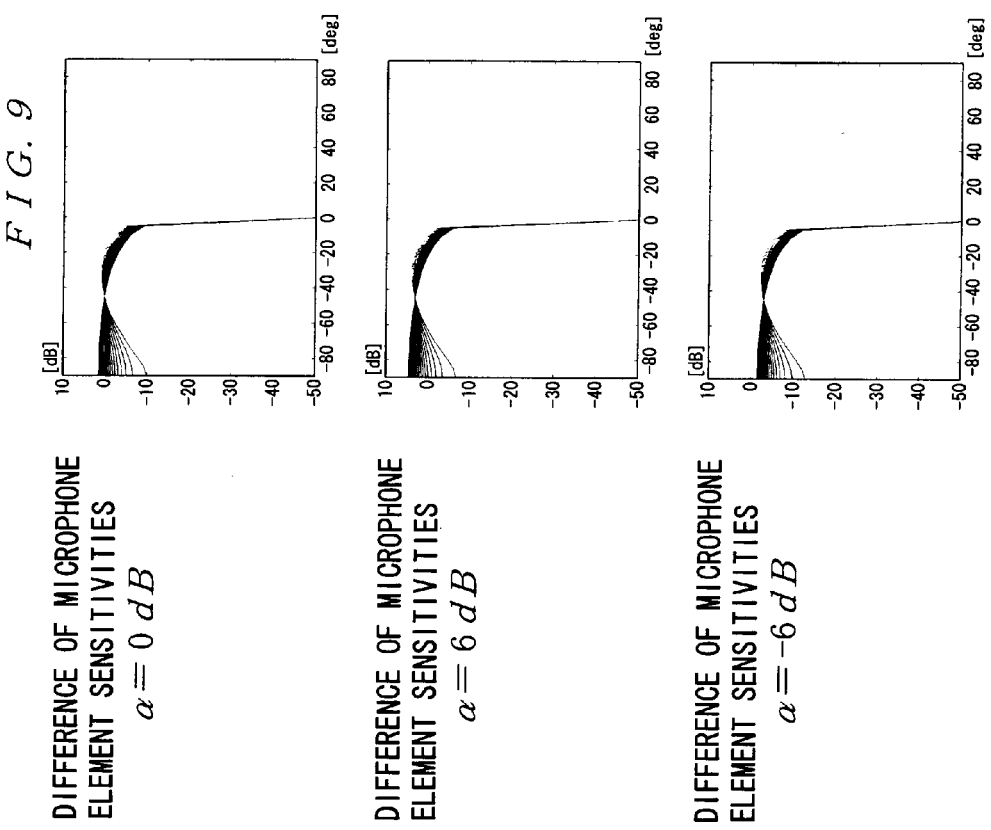
FIG. 9 is a diagram which shows directional characteristic of conjugate beamformers when a sensitivity of microphone elements is varied according to the embodiment.

To illustrate that a directional characteristics of a microphone array is not affected by a sensitivity of a MIC elements by applying above described processing in which weighted coefficients used in multipliers of the beamformers 30 and 31 are complex conjugate to each other, an example where calculation of a directional characteristics is performed when a difference of MIC element sensitivities α is varied to 0 db, +6 db, and −6 db is shown in FIG. 9. Although a directional characteristics symmetrical with respect to the perpendicular line to the straight line connecting the MICs 10 and 11 is not shown in the figure, the corresponding directional characteristics are symmetrical to that shown in FIG. 9. As can be seen from FIG. 9, when a gain is varied, an output level of the array microphone is varied, but a directional characteristics is not varied. Thus, a stable directional characteristics can be achieved in spite of using low-cost MICs and uneven sensitivity of MIC elements. In addition, while a directional null is formed in direction of ±45 degrees in the directional characteristics shown in the figure, since the directional characteristics has some width as can be seen from the figure, the directional null does not need to be precisely formed with respect to an actual target sound source. In addition, a directional characteristics of a single beamformer is shown in FIG. 10 in which a difference of sensitivity of MIC elements α is varied to 0 db, +6 db, and −6 db, and it can be seen from this figure that, if the sensitivity of MIC element is varied by 6 db, operation desired for the beamformer to form a direction null in a specific direction is almost unachievable. On the other hand, it is the most remarkable feature of the present invention that a resulting directional characteristics is the same as in the case that sensitivity of MIC elements are uniform in spite of using a beamformer with degraded directional characteristics as shown in FIG. 10.

The technique for forming a sharp directional null in a specific direction by a beamformer can be theoretically realized even with a few MICs, and therefore a measured signal is used for increasing an S/N ratio or used in a blocking matrix portion which is a reference signal generation section of a generalized sidelobe canceller that is often used as an adaptive filter. However, the technique can not form a directional null with performance as designed because of difference of sensitivity of MIC elements as described above. And this is one of major reasons why a predetermined performance cannot be achieved in an actual environment when mass production is intended.

FIG. 11 shows an example where a directional characteristics of 360 degree is obtained using the sound source separation device 1 as described above. As can been seen from the figure, the sound source separation device 1 has a directional characteristics for each 180 degree, and two directional characteristics are separated by their boundary without overlapping. As a further feature, such directional characteristics are not affected by sensitivity of MIC elements. In a liner array, a directional characteristics in a range other than range from −90 degrees to 90 degrees is symmetrical to that in a range from 0 degree to 90 degrees, and from −90 degrees to 0 degree. In this way, a directional characteristics is allowed to be divided into two zones with a boundary of a perpendicular line to a line connecting two microphones.

Figure 12:
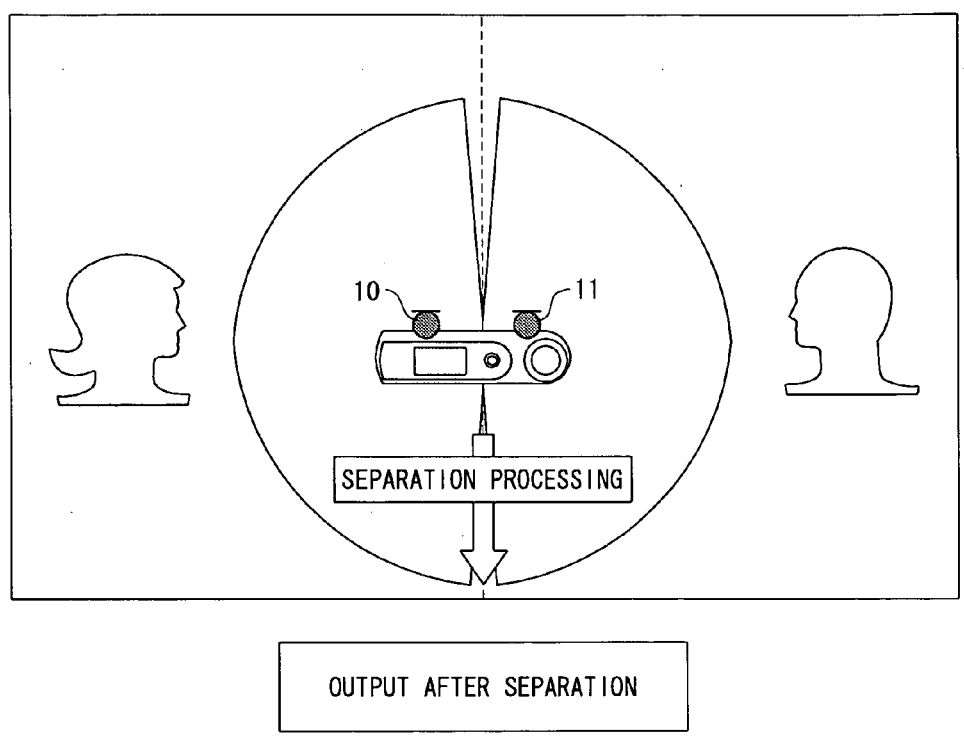
FIG. 12 is a diagram which shows an example of individual recording of two speakers using a directional characteristic of the sound source separation device according to the embodiment.
Figure 13:
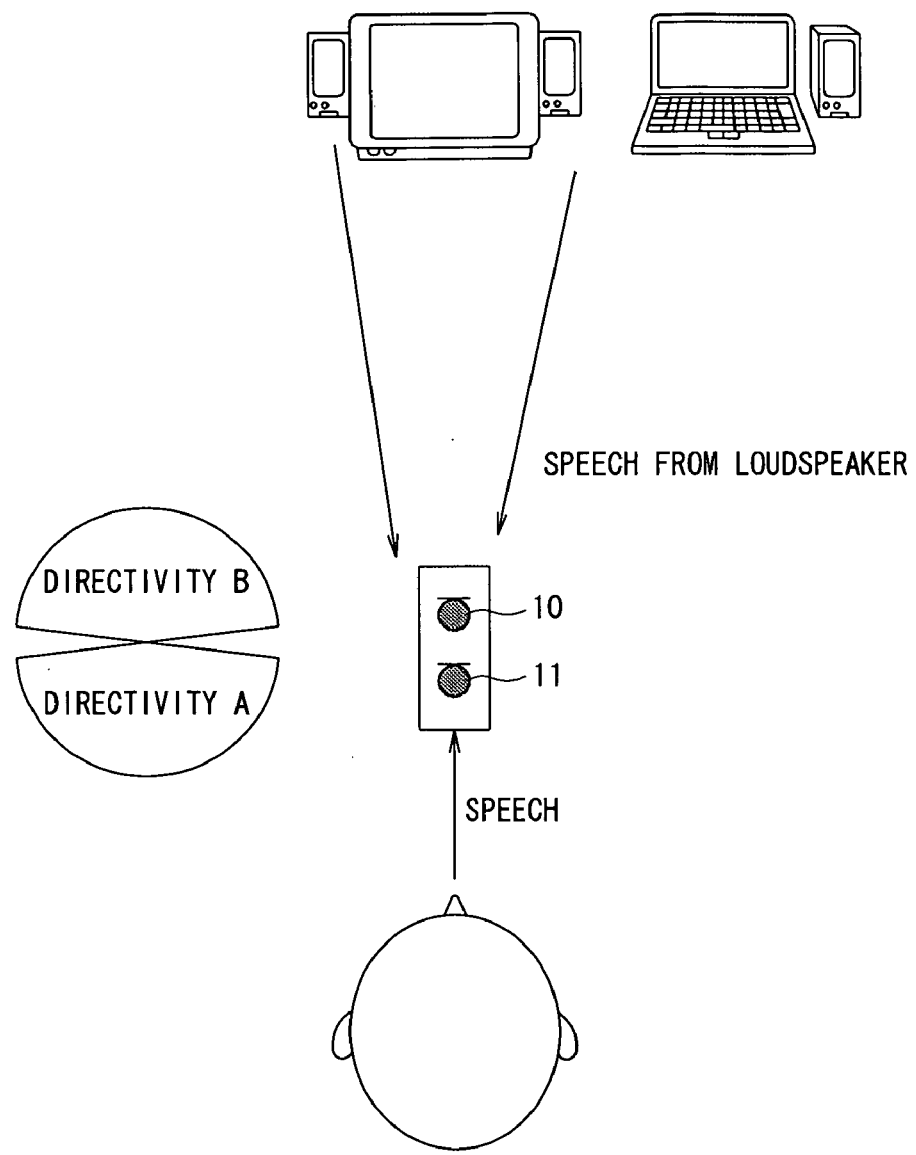
FIG. 13 is a diagram which shows an example of a simple hands-free device and a microphone for a speech recognition device using a directional characteristic of the sound source separation device according to the embodiment.

Examples using this directional characteristics are shown in FIG. 12 and FIG. 13. FIG. 12 is an application to a voice memo device. Conventionally, a voice memo device has been used for making a memo of a conference in a conference or meeting. In this example, a recorded content may be difficult to listen because a surrounding noise and voices of two persons are recorded simultaneously. In this case, two MICs 10 and 11 are directed to two speakers respectively, and contents of conversation at each person's side is enhanced and recorded by the sound source separation device 1, so that it is easy to listen at a later day. By using the sound source separation device 1 as described above, voices of facing two persons can be separated and collected, so that the device can be applied to a voice memo for minutes of conference and simultaneous speech recognition for each of two person's speech in minutes of conference.

FIG. 13 shows an example of application to a simple hands-free device and a microphone for a speech recognition device. Recently, an internet conference and the like have been held using a personal computer (hereinafter referred to a "PC"). When an internet conference is held from home or the like, a PC without echo canceller function requires a countermeasure such as a headset microphone or the like to reduce the echo from loudspeaker to a MIC. However, people do not easily accept an apparatus like a headset microphone closely worn on a part of human body. To address this, an echo canceller function may be implemented as software inside a PC, or a hands-free device with built-in echo canceller function may be connected to outside of the PC. If the echo canceller function is implemented inside the PC, played speech to a loudspeaker and input speech from microphone needs to be synchronized, and thus there are problems for implementation that a delay between played speech and input speech is large, a delay depends on PC model, and so on. It is costly that the hands-free device with built-in echo canceller function is connected to outside of the PC.

On the other hand, in the present example, although the MICs 10 and 11 have to be arranged between a loudspeaker and a speaker, they are not required to be synchronized with a played signal of the loudspeaker. Because sound source separation can be performed based on software installed on the PC by preparing two MICs 10 and 11 and feeding signals from them into PC, its implementation is easy.

In addition, it considered as an environment under which speech recognition is performed most frequently at home that users speak voice command toward a controlled device such as a television. In this case, a loudspeaker of the television or the like controlled device is placed facing toward a speaker side from a controlled device side, and it may happen that the speaker wants to speak a control command to a microphone device in a situation where speech or various guidance is coming from the loudspeaker. In this situation, it is necessary that the sound coming from loudspeaker to the microphone device is attenuated by some sort of means. A speech from the controlled device can be easily separated from a speech coming from the loudspeaker by using the sound source separation device 1, thereby speech recognition performance is improved.

<Result of Evaluation Experiment>

Next, result of evaluation experiment will be described. Conventionally, speech recognition has been applied to device control in automobiles and other purposes. Although technologies for reducing noises such as a blower sound of an air conditioner, a road noise, and a engine sound have conventionally been established, a speech recognition technology without being affected by a voice and the like has not been established. In view of the above, it is important to provide a speech recognition technology which realizes the followings features: (1) separation between speech of a driver in a driver's seat and speech of a passenger in a passenger's seat (hereinafter referred to as "speech of the driver's seat and the passenger's seat"), (2) movement of a speaker's head position is allowable, (3) both large beam width and separation performance are achieved at the same time, (4) function is provided using a few MICs, and (5) a driver or a passenger is not forced to be quiet during use of speech recognition.

To show the effectiveness of the sound source separation device 1, speech recognition experiment was conducted in which two speakers spoke simultaneously in a car, recording was performed by two MICs, and sound sources were separated by the sound source separation device. This sound source separation device has been developed for purpose of separation of two sound sources, and allows, for example, separation of speech of the driver's seat and the passenger's seat as usage in an automobile. As installation positions of the MICs for this purpose, a central part in the automobile such as a mounting position L1 or a mounting position L2 is suitable as shown in FIG. 14. If they are installed in the mounting position L2, since a rear-view mirror 400 faces toward the driver, the MICs may be installed such that a mounting direction roughly faces toward front when the MICs are mounted or a directional characteristics control function described later may be provided. Since beam width is originally large in the sound source separation device 1, precise positioning is not required. In addition, when they are installed in the mounting position L2, it may be useful for suppressing a reflection from backside to devise a microphone module or use a directional microphone.

Conditions of the evaluation experiment are shown in FIG. 15, and results of the evaluation experiment after sound separation are shown in FIGS. 16A and 16B. As shown in FIG. 16A, in a case of simultaneous speech of two speakers in a car (in-car simultaneous speech), when processing was not applied, i.e., in a conventional method 1 which uses only 1-channel microphone, 29% (in stopping), 27% (in driving at 60 km/h) were shown, and when the present speech separation technique was applied, improvements were shown as 78% (in stopping), 78% (in driving at 60 km/h). In addition, FIG. 16B shows the evaluation result of the percentage of the case that a speech of the passenger's seat side is speech-recognized in mistake for a speech of the driver's seat side or a speech of the driver's seat side is speech-recognized in mistake for a speech of the passenger's seat side. When the conventional 1-channel microphone was only used (in-car one person speech), such speech recognition results were outputted in 93% of all the speeches (rejection rate 7%), and when the present technique was applied, the percentage of output of such speech recognition results was 0% (rejection rate 100%). In addition, performance comparison in stop states was performed in which "METHOD AND DEVICE FOR NOISE COMPONENT SUPPRESSION PROCESSING METHOD" (U.S. Pat. No. 3,484,112) as a conventional art using two MICs was defined as a conventional method 2. Although the conventional method 2 is a scheme which performs adaptive beamforming processing while estimating arrival directions of a target sound and a noise, emphasizes the target sound and the noise, and performs spectral subtraction in a frequency domain to subtract a signal of the emphasized noise from a signal of the emphasized target sound, for preventing the effect of estimation error of arrival direction, processing was performed in which a target sound and a noise are both assumed to be known (arrive from a fixed direction), and an optimum value of an adaptive beamformer section is obtained, and then a target sound (a speaker 1) and a noise (a speaker 2) are simultaneously played, and the target sound is extracted (see FIG. 16A).

Second Embodiment

Figure 17:
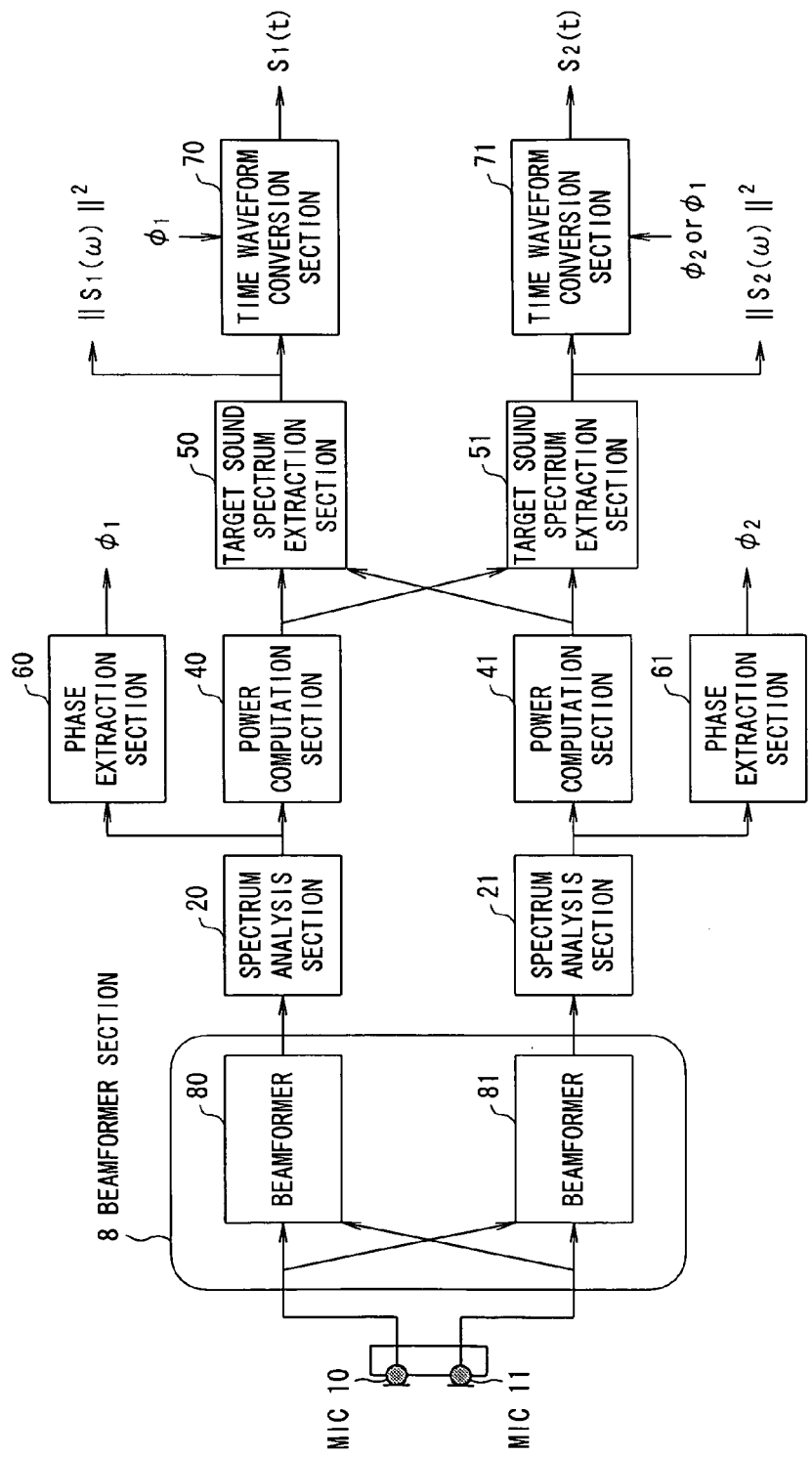
FIG. 17 is a diagram which shows a configuration of a sound source separation system according to a second embodiment.
Figure 18:
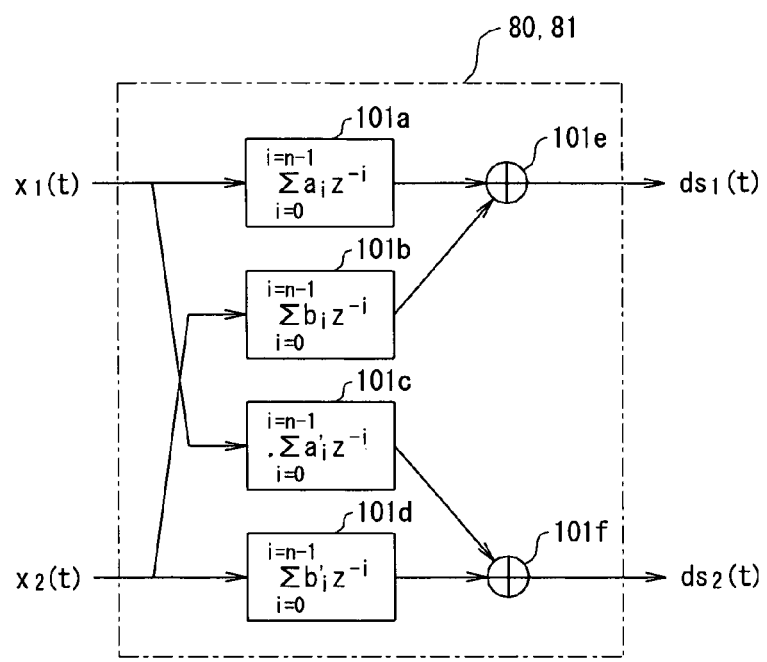
FIG. 18 is a diagram which shows a configuration of a beamformer according to the embodiment.

Next, the second embodiment will be described. FIG. 17 shows a configuration of a sound source separation system according to the second embodiment. Although inputs from the MICs 10 and 11 are converted into frequency components at first by the spectrum analysis sections 20 and 21 in the above described first embodiment, in the present embodiment, a directional null is formed in a time domain by beamformers 80 and 81 at first, and generate a signal in which a signal from a specific arrival direction is attenuated by beamformers 80 and 81, and then conversion into frequency components is performed by the spectrum analysis sections 20 and 21. In FIG. 17, those having the same functions as in FIG. 1 are given the same reference numbers. Configurations of the beamformers 80 and 81 are implemented by performing filter processing configured as a form of an FIR filter or the like as shown in FIG. 18. At this time, coefficients of the FIR filter can be obtained by converting the weighted coefficients that are in complex conjugate pairs in the frequency domain shown in FIG. 3 into filter coefficients in a time domain.

Third Embodiment

Figure 19:
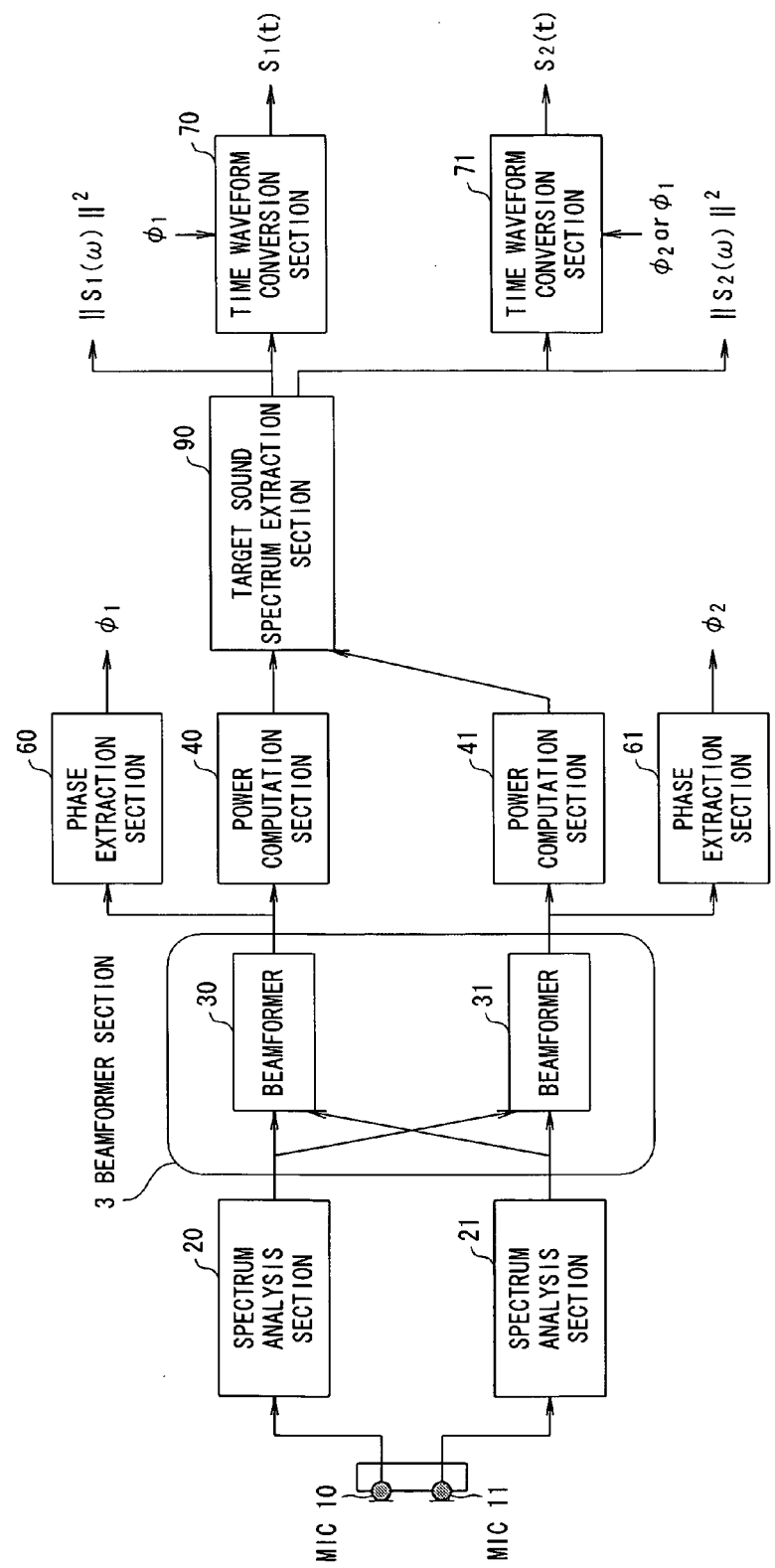
FIG. 19 is a diagram which shows a configuration of a sound source separation system according to a third embodiment.
Figure 20:
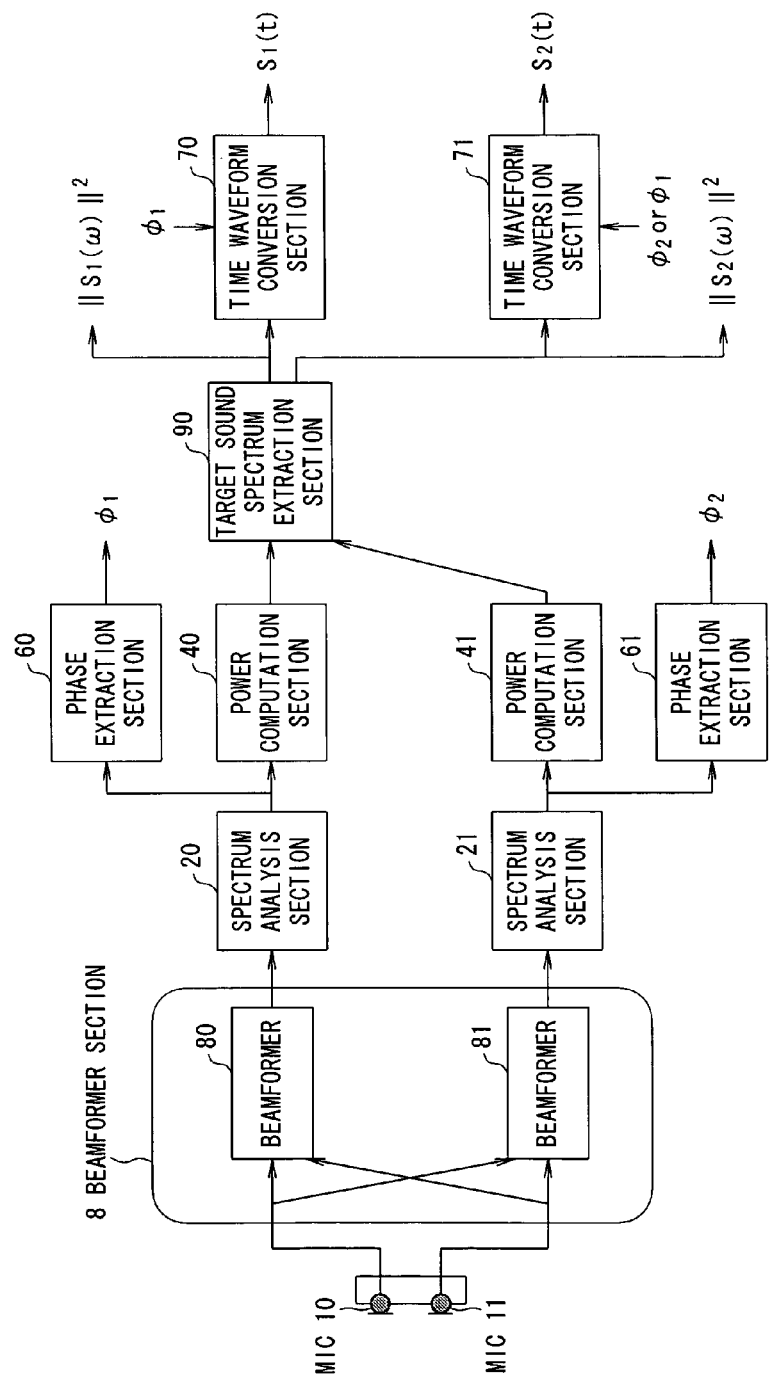
FIG. 20 is a diagram which shows a configuration of another sound source separation system according to the embodiment.

Next, the third embodiment will be described. FIG. 19 and FIG. 20 are diagrams which show configurations of sound source separation systems according to the third embodiment. As described above, the target sound spectrum extraction sections 50 and 51 shown in FIG. 1 and FIG. 17 are implemented as the configuration shown in FIG. 5, and are configured to perform sound source separation processing using an optimum threshold value obtained by experiment.

On the other hand, as shown in FIG. 8, it is understood that $dr_i(\omega)$ (i=1, 2) which are outputs of the difference calculation sections 500 and 501 in the target sound spectrum extraction sections 50 and 51 are point-symmetric with respect to the front 0 degree. Therefore, when thresholds are set to "0" in the coefficient conversion sections 501 and 511 in the target sound spectrum extraction sections 50 and 51 by checking only signs in the calculation sections 500 and 501, if it is positive, power spectrum information of a sound source signal coming from right direction (0 degree to 90 degrees) is extracted, and if it is negative, power spectrum information of a sound source signal coming from left direction (−90 degrees to 0 degree) is extracted. Accordingly, the entire configurations shown in FIG. 1 and FIG. 17 are simplified to configurations as shown in FIG. 19 and FIG. 20. A target sound spectrum extraction section 90 in FIG. 19 and FIG. 20 is implemented as a configuration shown in FIG. 21.

Figure 21:
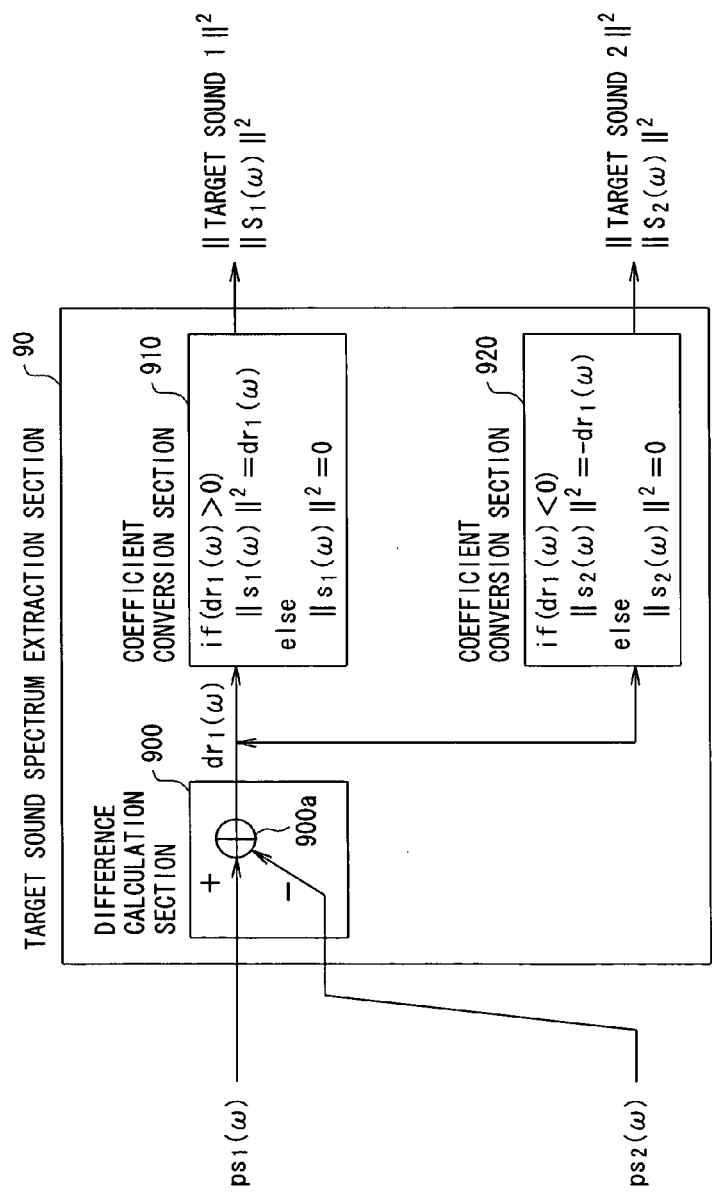
FIG. 21 is a diagram which shows a configuration of a target sound spectrum extraction section according to the embodiment.

In FIG. 21, power spectrum information of the beamformers 30 and 31 computed by the power computation sections 40 and 41 is inputted to a difference calculation section 900 inside the target sound spectrum extraction section 90. Then, subtraction processing is performed by a subtractor 900a, and sound source signals only from targets direction are extracted by coefficient conversion sections 910 and 920 respectively. Specifically, the coefficient conversion section 910 is a block for extracting a sound source from right direction (0 degree to 90 degrees), and if an input is positive, its spectrum information is outputted as information coming from right direction (0 degree to 90 degrees), and if an input is negative, spectrum information is considered as information of a sound source arriving from a direction other than the target, and thus not outputted. On the other hand, the coefficient conversion section 920 is a block for extracting a sound source from left direction (−90 degrees to 0 degree), and if an input is negative, its spectrum information is outputted as information coming from left direction (−90 degrees to 0 degree), and if an input is positive, spectrum information is considered as information of a sound source arriving from a direction other than the target, and thus not outputted. The above described operation allows separation of sound signals arriving from left and right with respect to the perpendicular line to the straight line connecting the two MICs 10 and 11.

Configurations of the sound source separation system shown in FIG. 19 and the sound source separation system shown in FIG. 20 are different in that beamforming processing is performed in a frequency domain or a time domain. In FIG. 19, beamforming processing is performed in a frequency domain, and in FIG. 20, it is performed in a time domain.

Fourth Embodiment

Figure 22:
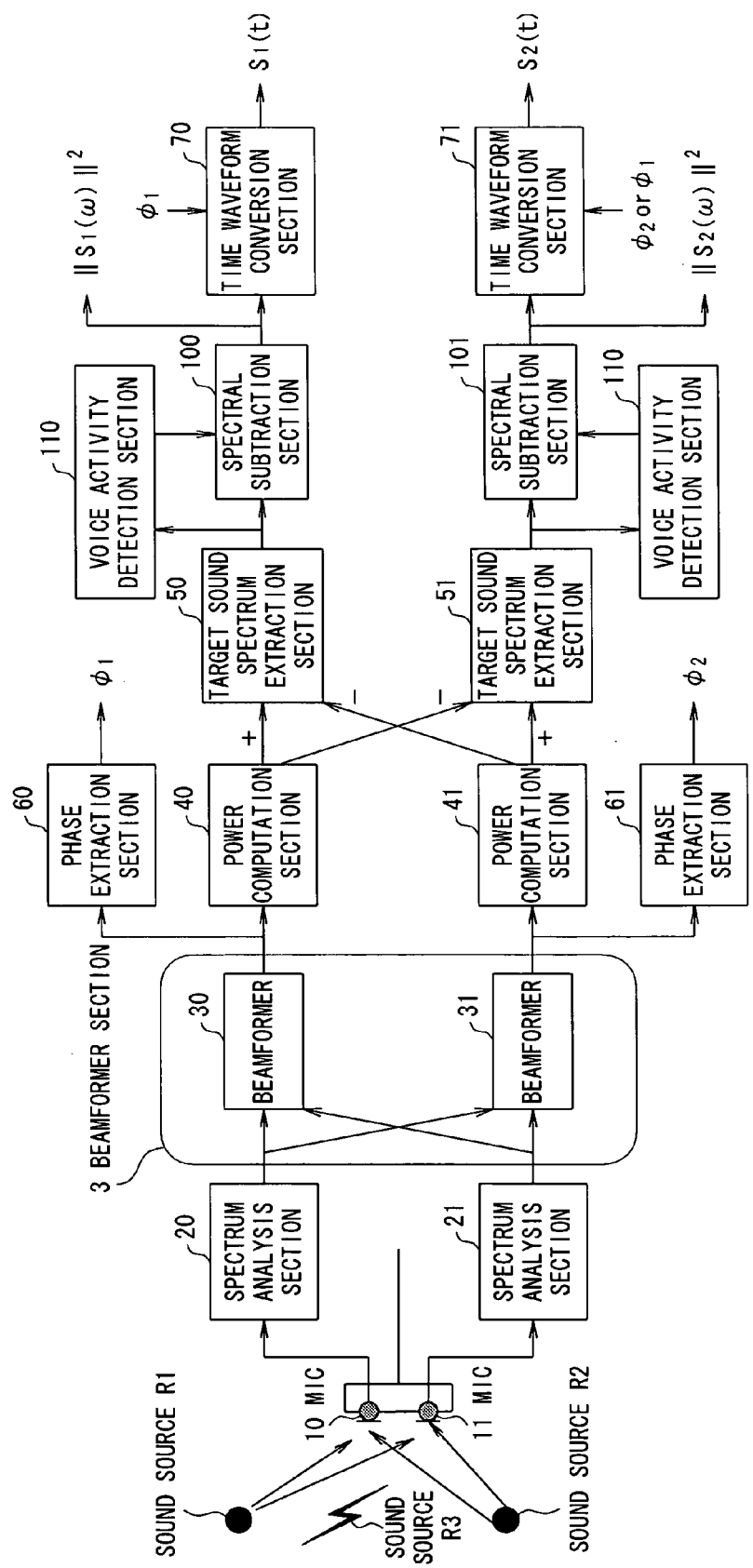
FIG. 22 is a diagram which shows a configuration of a sound source separation system according to a fourth embodiment.

Next, the fourth embodiment will be described. FIG. 22 is a diagram which shows a configuration of a sound source separation system according to the fourth embodiment. Spectral subtraction sections 100 and 101 shown in the figure performs spectral subtraction processing for eliminating a stationary noise, a diffuse noise, and the like whose arrival direction is unknown, which have superimposed on each target sound extracted by the target sound spectrum extraction sections 50 and 51. This configuration is effective when it is used in an environment in which there is a fan noise of an air-conditioner or a projector, or the like in a meeting room, but is particularly effective when it is used in an automobile. Such as in a case where a driver and a passenger in a passenger's seat is on board in an automobile, for example, speech of the driver's seat and the passenger's seat can be extracted separately by using the foregoing scheme. However, one whose arriving direction is unknown and diffuse noise such as a blower sound of an air conditioner, a road noise, and a wind noise cannot be eliminated by the foregoing method. Affection of these noises can be eliminated by adding spectrum subtraction processing in a subsequent stage of the process. As the spectrum subtraction processing, there are a type in which a voice activity detection is performed for an input signal of one MIC, a noise spectrum in non-speech section is estimated, and a previously estimated noise component is scaled and subtracted from the speech section; and a type in which, using a spectrum of a signal in which a noise is dominantly recorded and a spectrum of a signal in which a speech is dominantly recorded, a spectrum of the signal in which the noise is dominantly recorded is scaled and subtracted from a spectrum of the signal in which the speech is dominantly recorded. Processing based on a 1-microphone system is enough for speech recognition in many cases, and this is employed also in the present embodiment. To support this, in the sound source separation system according to the present embodiment, a voice activity detection section 110 and the spectral subtraction sections 100 and 101 are newly added to the sound source separation system according to the first embodiment.

In FIG. 22, sound sources R1 and R2 are target sounds, and a sound source R3 represents noises such as a stationary noise whose arrival direction is unknown and a diffuse noise. Many of these noises do not have clear directivity. In the case of these noises, at output of a target sound spectrum extraction sections, a noise having weak directivity is often contained in a target sound spectrum extraction section which extracts a sound source from its direction, and a noise having no directivity, an impact noise occurred when a joint of a road is passed, or the like is often detected in spectrums extracted from left and right alternately. However, these noises can be eliminated by the spectral subtraction sections 100 and 101. As a spectral subtraction, a continuous spectral subtraction which does not require voice activity detection section may be used.

Fifth Embodiment

Figure 23:
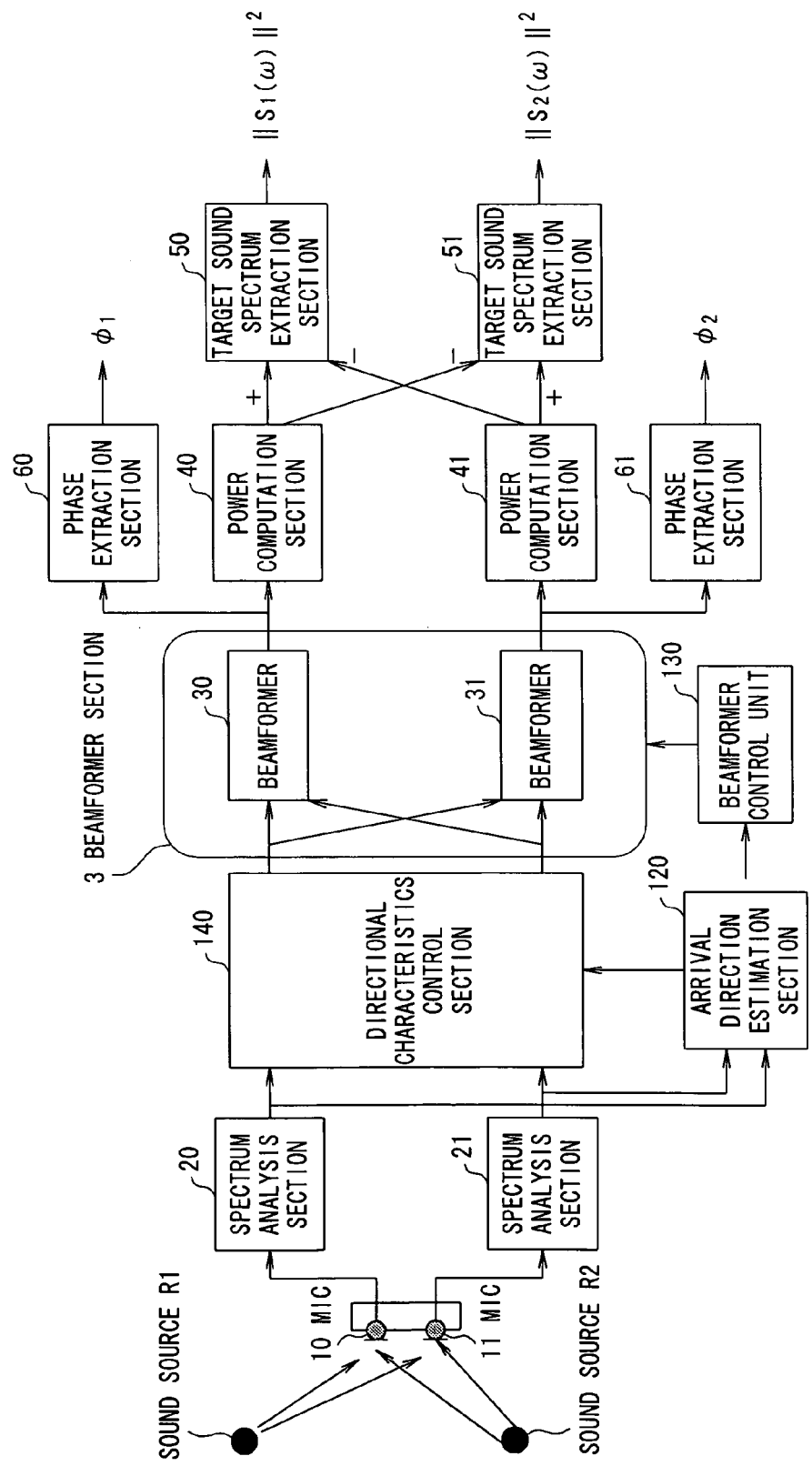
FIG. 23 is a diagram which shows a configuration of a sound source separation system according to a fifth embodiment.

Next, the fifth embodiment will be described. FIG. 23 shows a configuration of a sound source separation system according to the fifth embodiment. In the present embodiment, a measure is shown in a case where the two target sound sources R1 and R2 to be separated are placed far away from positions symmetrical with respect to the perpendicular line to the straight line connecting the two MICs 10 and 11. In the present embodiment, for this measure, the sound source separation system includes arrival direction estimation section 120 for detecting approximate positions of two target sound sources R1 and R2, and delay operation is applied to input of one of the MICs by a directional characteristics control section 140 so as to make the two target sound sources R1 and R2 to be separated virtually symmetrical with respect to the perpendicular line to the straight line connecting the two MICs 10 and 11 as much as possible with approximate sound source arrival direction information of the two target sound sources R1 and R2 based on its positions estimated by the arrival direction estimation section 120.

Figure 24:
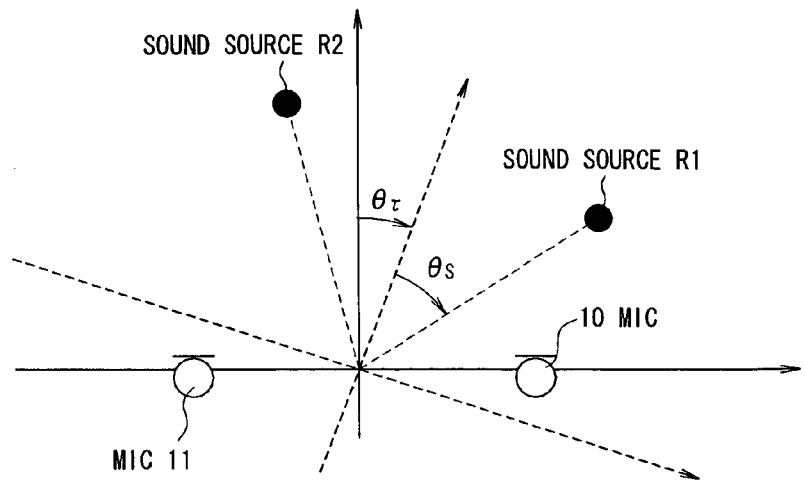
FIG. 24 is a diagram which shows an example of directional characteristic control according to the embodiment.

FIG. 24 shows a situation where two sound sources R1 and R2 are symmetrical with respect to a straight line which has rotated by θτ with respect to the perpendicular line to the straight line connecting the MICs 10 and 11. In this case, a situation equivalent to θτ rotation can be achieved by applying a certain delay θd to a signal captured by one of the MICs.

In addition, it may be configured that filter parameters of the beamformers 30 and 31 which are optimum for separating two sound sources are prepared based on positional relationships with respect to the perpendicular line to the straight line connecting the two MICs for some combinations of two sound sources, beamformer's filter parameters which are assumed to be optimum for separating the two sound sources in a current situation are selected by beamformer control based on approximate arrival direction information of the two sound sources from the arrival direction estimation section 120, and the selected beamformer's filter parameters are set in the beamformers 30 and 31.

Figure 25A:
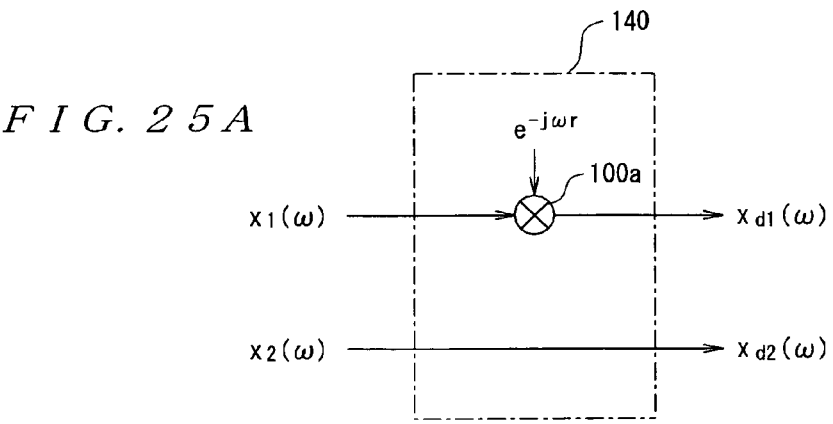
FIGS. 25A and 25B are diagrams which show a configuration of a directional characteristic control section according to the embodiment.
Figure 25B:
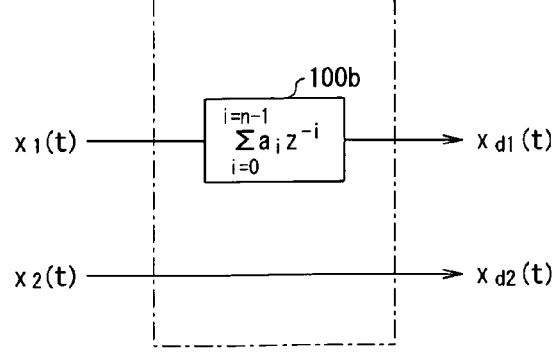

FIGS. 25A and 25B show configuration examples of the directional characteristics control section 140. A configuration example shown in FIG. 25A shows an example in which a certain delay τd is applied to each frequency component in a frequency domain of a signal captured by one of the MICs. In the case of the configuration example shown in FIG. 25A, $x_1(\omega)$ is multiplied by $e^{-j\omega\tau}$ by the multiplier 100a, thereby achieving a delay operation. On the other hand, when beamformer is performed in a time domain, filtering processing needs to be performed by a delay device 100b in an FIR filter form as shown in FIG. 25B.

In addition, instead of applying a delay to input of one of the MICs, a half of the delay may be applied to each of inputs of both the MICs so that the same quantity of the delay operation is achieved as an entire processing. In other words, instead of applying a delay τd to a signal captured by one of the MICs, a delay τd/2 is applied to the signal captured by the one of the MICs and a delay −τd/2 is applied to a signal captured by the other of the MICs, so that a total delay difference can be τd.

Sixth Embodiment

Figure 26:
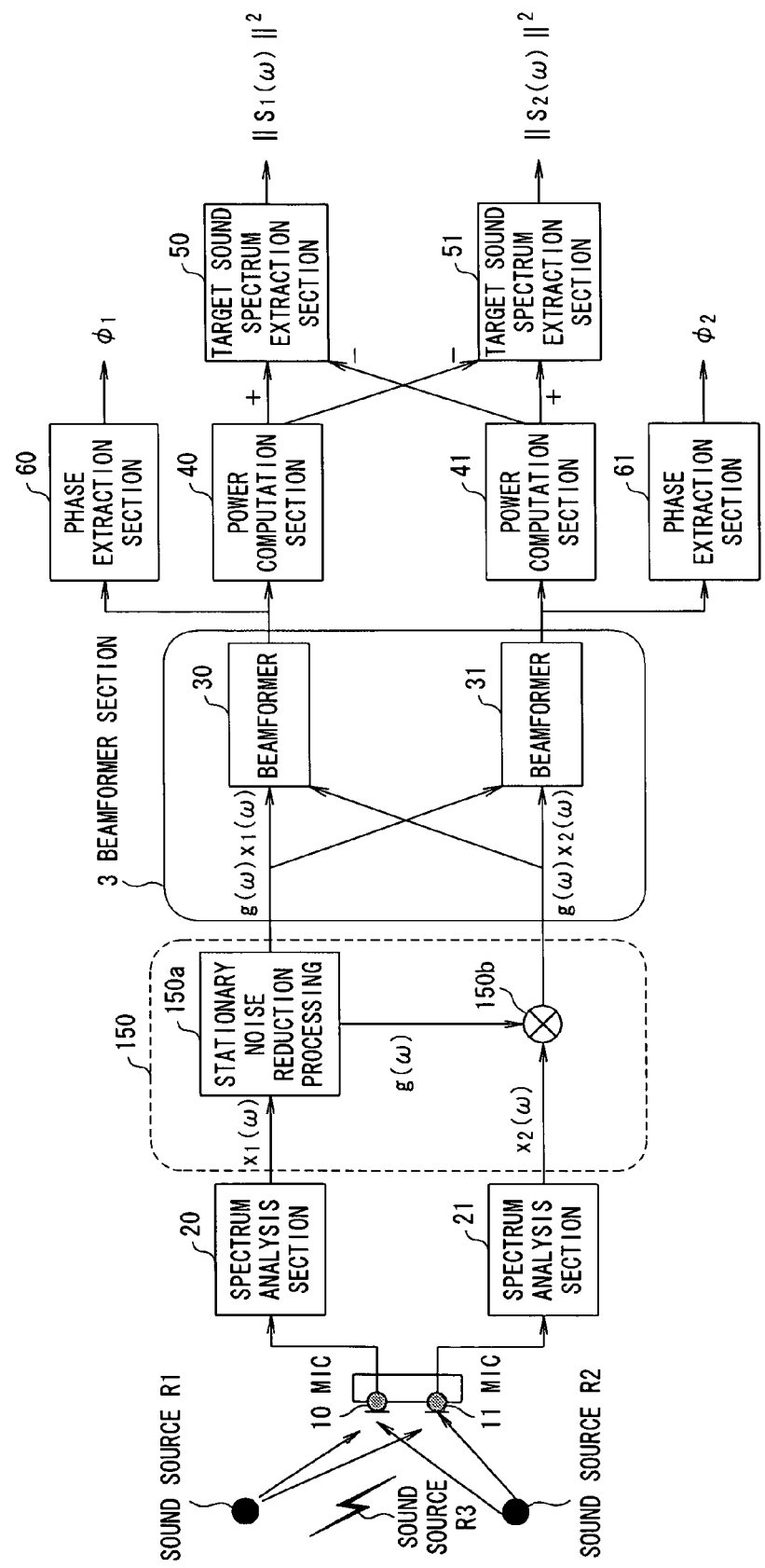
FIG. 26 is a diagram which shows a configuration of a sound source separation system according to a sixth embodiment.

Next, the sixth embodiment will be described. FIG. 26 is a diagram which shows a configuration of a sound source separation system according to the sixth embodiment. The sound source separation system according to the present embodiment has a configuration which lays weight on audibility in consideration of application to hands-free call in an automobile and the like. Such as in a case where a driver and a passenger in a passenger's seat is on board in an automobile, for example, speech of the driver's seat and the passenger's seat can be separately extracted using the foregoing scheme. However, one whose arriving direction is unknown and diffuse noise such as a blower sound of an air conditioner, a road noise, and a wind noise cannot be eliminated by the foregoing method. In these cases, as described in the fourth embodiment, influence of these noises can be eliminated by adding spectrum subtraction processing in a subsequent stage of the process, and this is most suitable for applications such as speech recognition in which sound quality in terms of audibility is not taken in account. However, when this is used in a MIC for a hands-free call device, a residual unremoved noise called a musical noise may become a problem. In the present invention, since left and right sounds are separated with respect to the perpendicular line to the straight line connecting the two MICs 10 and 11, a noise such as a diffuse noise whose directivity continually varies may be allocated into left and right separation results irregularly, thereby degrading sound quality.

Therefore, in the present embodiment, utilizing that the sound source separation scheme according to the present invention is not affected by time variation of a microphone gain, post-filter processing which is typically used in a subsequent stage of microphone array processing is added in a previous stage of beamformer processing so that a diffuse noise, a stationary noise, and the like are reduced, thereby a musical noise after sound source separation is prevented.

Seventh Embodiment

Figure 27:
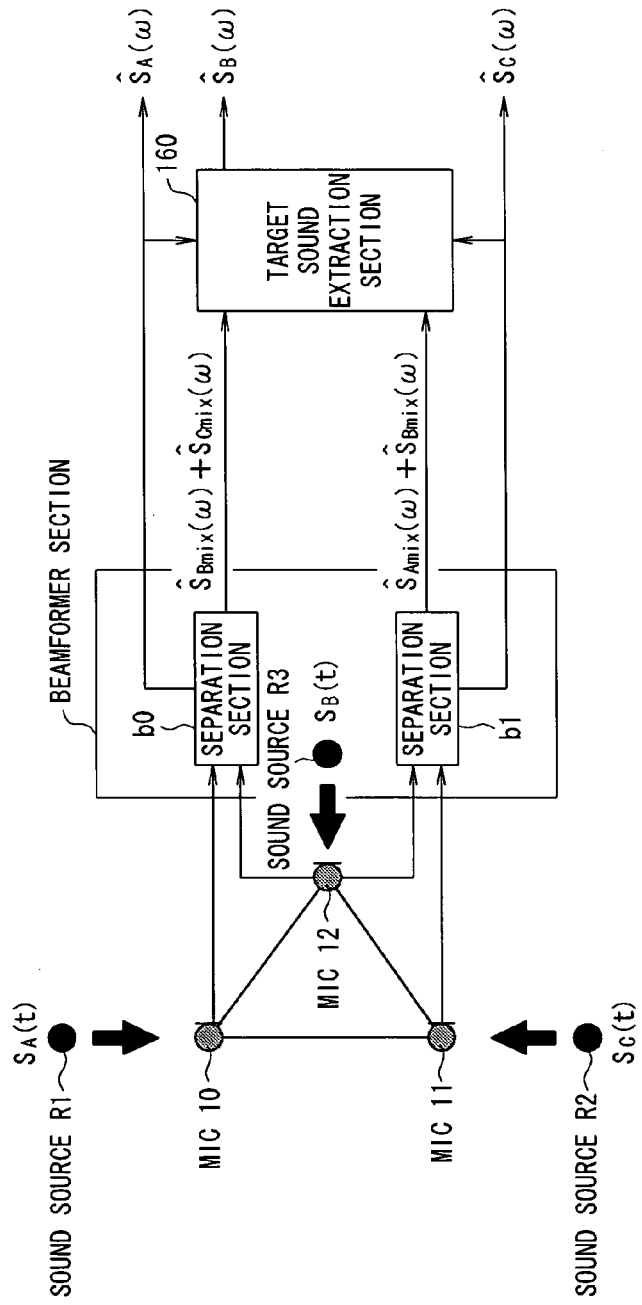
FIG. 27 is a diagram which shows a configuration of a sound source separation system according to a seventh embodiment.

Next, the seventh embodiment will be described. FIG. 27 is a diagram which shows a configuration of a sound source separation system according to the seventh embodiment. This sound source separation system illustrates a configuration in which three MICs 10, 11 and 12 are used to separate three sound sources. In the figure, using MICs 10 and 12 and MICs 11 and 12, left and right sound source signals are separated with respect to a perpendicular line to a straight line connecting respective two MICs, and using a total of four sound source signals which have been separated using two pairs of MICs, a sound source R3 arriving from the vicinity of front of the MICs 10 and 11 is finally separated by a target sound extracting section 160.

Figure 28:
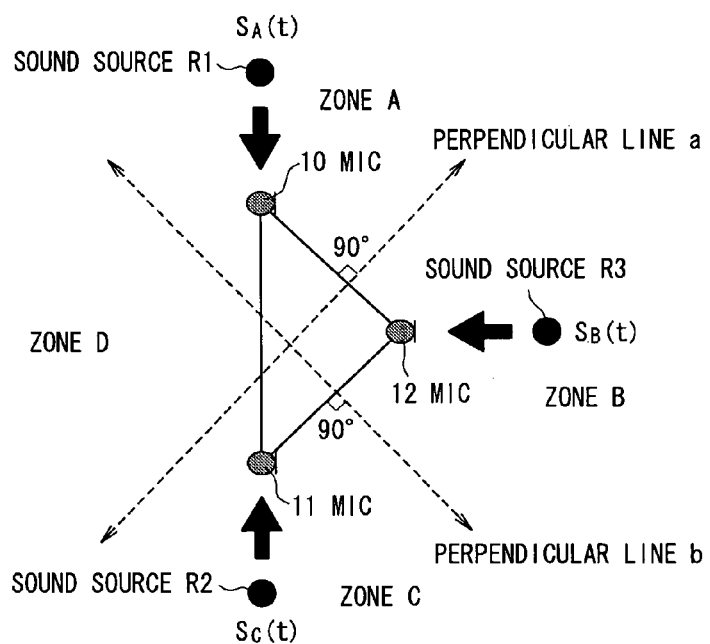
FIG. 28 is a diagram for describing positions of sound sources to be separated according to the embodiment.

When sound sources to be separated by this configuration is described using FIG. 28, sound sources arriving from right and left to a perpendicular line can be separated with respect to a perpendicular line a and a perpendicular line b which are connecting two MICs respectively as shown in FIG. 28. In FIG. 28, when assuming that a sound source locates in each area of zones A, B and C, sound source signals arriving from zone A and zones B and C can be separated using the perpendicular line a, and sound source signals arriving from zones A and B and zone C can be separated using the perpendicular line b. In FIG. 27, blocks for performing these separations are separation sections b0 and b1. From a signal on which the three sound sources are superimposed, the separation section b0 can separate a sound source signal $S_A(\omega)$ from zone A and a signal in which sound source signals $S_{Bmix}(\omega)$ and $S_{Cmix}(\omega)$ from zones B and C are mixed, and similarly the separation section b1 can separate a signal in which sound source signals $S_{Amix}(\omega)$ and $S_{Bmix}(\omega)$ from zones A and B are mixed and a sound source signal $S_C(\omega)$ from zone C, and thus $S_A(\omega)$ and $S_C(\omega)$ have been separated in this stage. From the four signals obtained in this way, $S_B(\omega)$ can be obtained by a predetermined operation in a power spectrum domain by the target sound extraction section 160. As used herein, $S_{Amix}(\omega)$, $S_{Bmix}(\omega)$, $S_{Cmix}(\omega)$ represent respective signals which mixed with other signals.

Although it is assumed that sound source information does not exists in zone D or, even if sound information exists, its level is low in the above description, if a sound source exists in zone D, interfusion of a sound signal from zone D can be greatly reduced by using directional microphones as the three MICs 10, 11 and 12.

Figure 29:
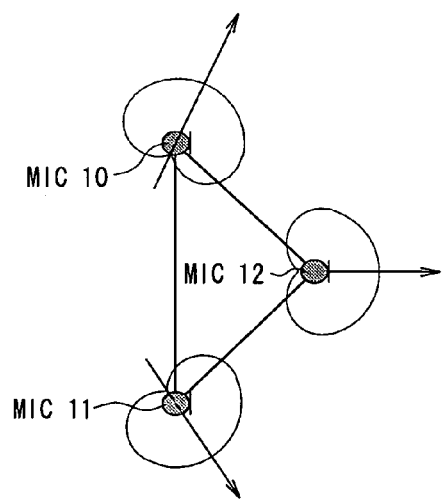
FIG. 29 is a diagram which shows an example of installation of a unidirectional microphone according to the embodiment.

FIG. 29 shows an example of installation of a unidirectional microphone. While, in general, when directional microphones are used in this way, performance as designed may not be achieved at a beamformer section of an array microphone due to uneven directional characteristics of each MIC or the like, certain performance can be achieved without being affected by uneven directional characteristics as in the case where the present scheme is not affected by uneven sensitivity of MIC elements by its nature.

Figure 30:
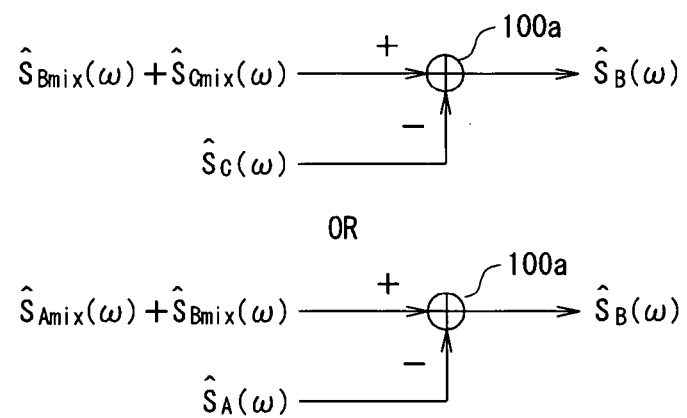
FIG. 30 is a diagram which shows one example of a configuration of a target sound extraction section according to the embodiment.

A processing scheme in the target sound extraction section 160 will be described in detail with reference to FIGS. 30 to 32. A processing scheme shown in FIG. 30 is a processing scheme similar to 2-channel spectral subtraction processing. Thus a sum of power spectrums of a target sound and an interfering sound has been determined for a channel, and a power spectrum of an interfering sound has been determined for the other channel, therefore a target sound $S_B(\omega)$ can be obtained by performing subtraction on them by a subtractor 100a.

Figure 31:
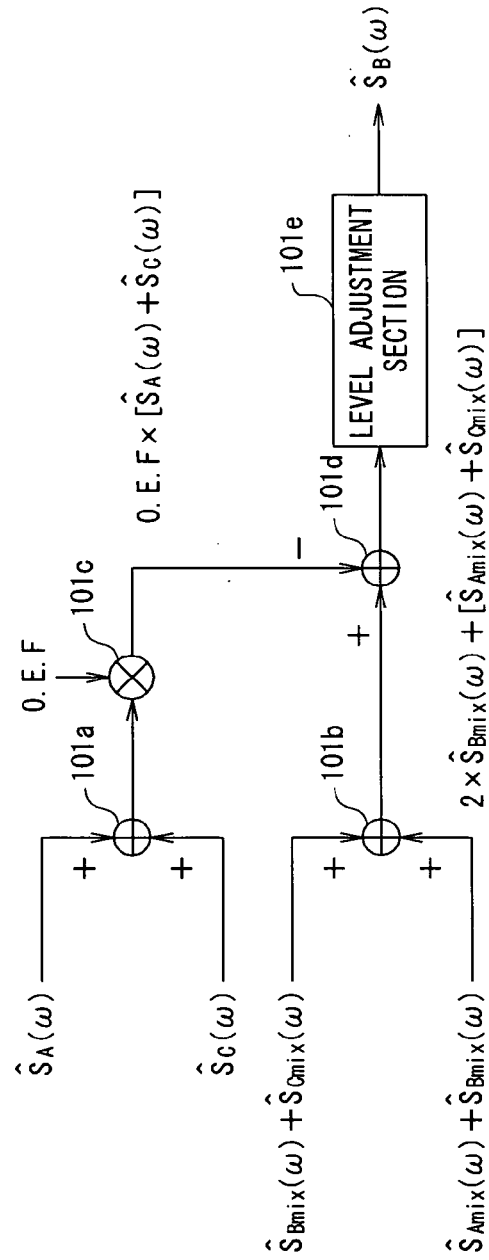
FIG. 31 is a diagram which shows one example of a configuration of the target sound extraction section according to the embodiment.

In a processing scheme shown in FIG. 31, since two signals in which an interfering sound is superimposed on a target sound can be obtained, they are added by an adder 101b so that a value of power spectrum information of the target sound is doubled, and on the other hand, interfering sounds are summed by the adder 101a so that a power spectrum of the interfering sound is obtained, and then it is multiplied by a certain factor (O.E.F 1 to 2) by a multiplier 101c and a difference between the output of the multiplier 101c and the output of the adder 101b is calculated by a subtractor 101d, thereby the target sound is extracted. In addition, since the sound volume is larger than that of the original sound signal at the stage of output from the subtractor 101d, level adjustment is performed by a level adjustment section 101e.

Figure 32:
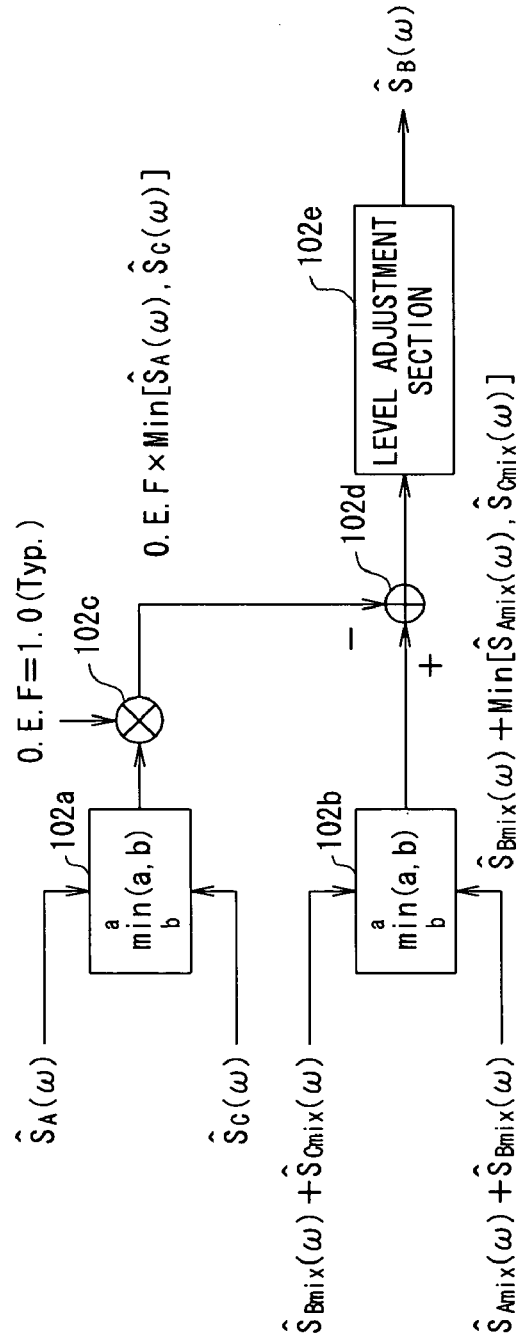
FIG. 32 is a diagram which shows one example of a configuration of the target sound extraction section according to the embodiment.

In a processing scheme shown in FIG. 32, minimum value calculations 102a and 102b are used instead of the adders 101a and 101b shown in FIG. 31. Although in FIG. 31 sound quality is good when O.E.F is larger than 1.0 in many cases, O.E.F is preferably around 1.0 in FIG. 32. Although minimum value calculation is performed in FIG. 32, maximum value calculation may be performed instead of minimum value calculation.

Although there may be a case where a position of a target sound source to be separated is placed far away from a position at which optimum separation performance is obtained by the present technique, as described in the fifth embodiment, operation for obtaining optimum separation performance as much as possible can be performed by applying a delay to an input signal outputted from a MIC so as to virtually change an arrival direction of a sound source.

Figure 33:
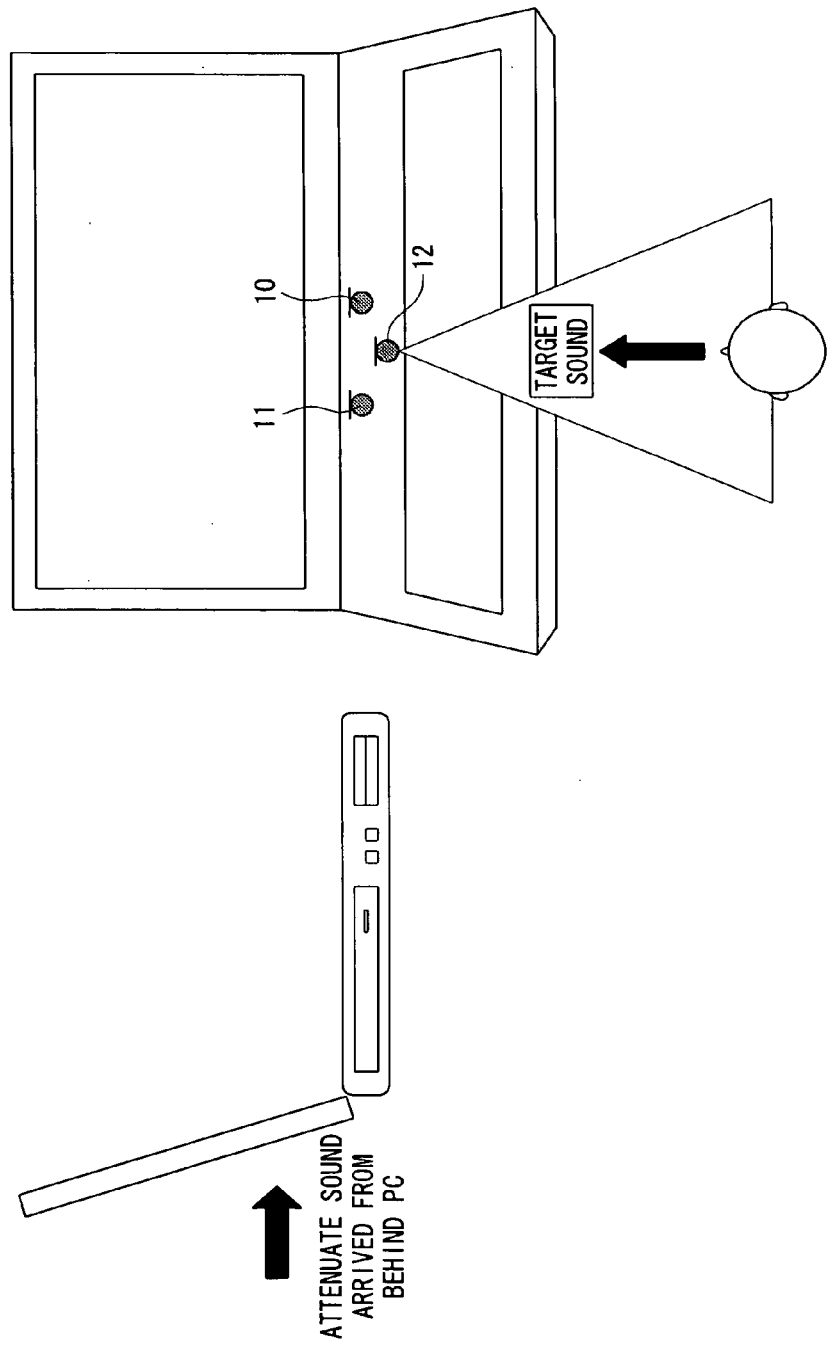
FIG. 33 is a diagram which shows an example of speech input to a personal computer using a sound source separation device according to the embodiment.

FIG. 33 shows a usage example of the sound source separation system according to the present embodiment. For purpose of speech input to a PC, shown example has a directional characteristics to capture a speech from the front side of the PC by using three MICs 10, 11 and 12 with a small area for implementation.

Eighth Embodiment

Figure 34:
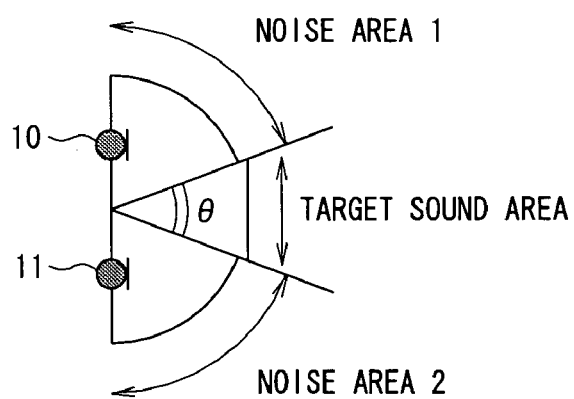
FIG. 34 is a diagram for describing a target sound area and a noise area according to an eighth embodiment.

Next, the eighth embodiment will be described. While, in the foregoing embodiments, (1) an embodiment which separates sound from left and right with respect to a straight line connecting between MICs using the two MICs, and (2) an embodiment which separates a sound from front side and sounds from the left and right of it using three MICs have been described, there is a case that it is desirable that a sound from front of a line connecting the two MICs 10 and 11 is separated and extracted using the two MICs 10 and 11 as shown in FIG. 34.

Figure 36:
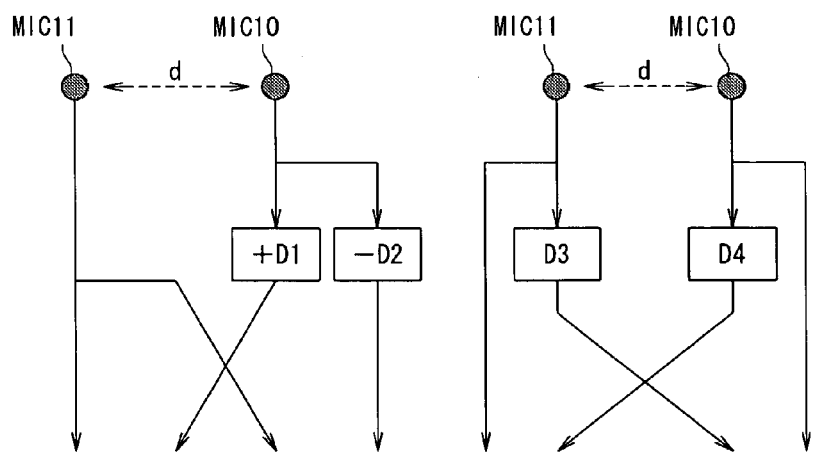
FIG. 36 is a diagram which shows a configuration example of directional characteristics control means according to the embodiment.

In this case, directional characteristics control means applies a delay to an output signal from one of the two MICs 10 and 11 to create a virtual microphone position of the third channel as shown in FIG. 35B, so that 3-microphone input shown in FIG. 35A can be virtually realized. FIG. 36 shows a configuration example of the directional characteristics control means shown in FIGS. 35A and 35B which performs delay operation. While Di (i=1,2,3,4) denotes a delay element in the figure, in actual delay operation, delay operation may be performed in a time domain, or may be performed in a frequency domain after spectrum analysis.

Figure 37:
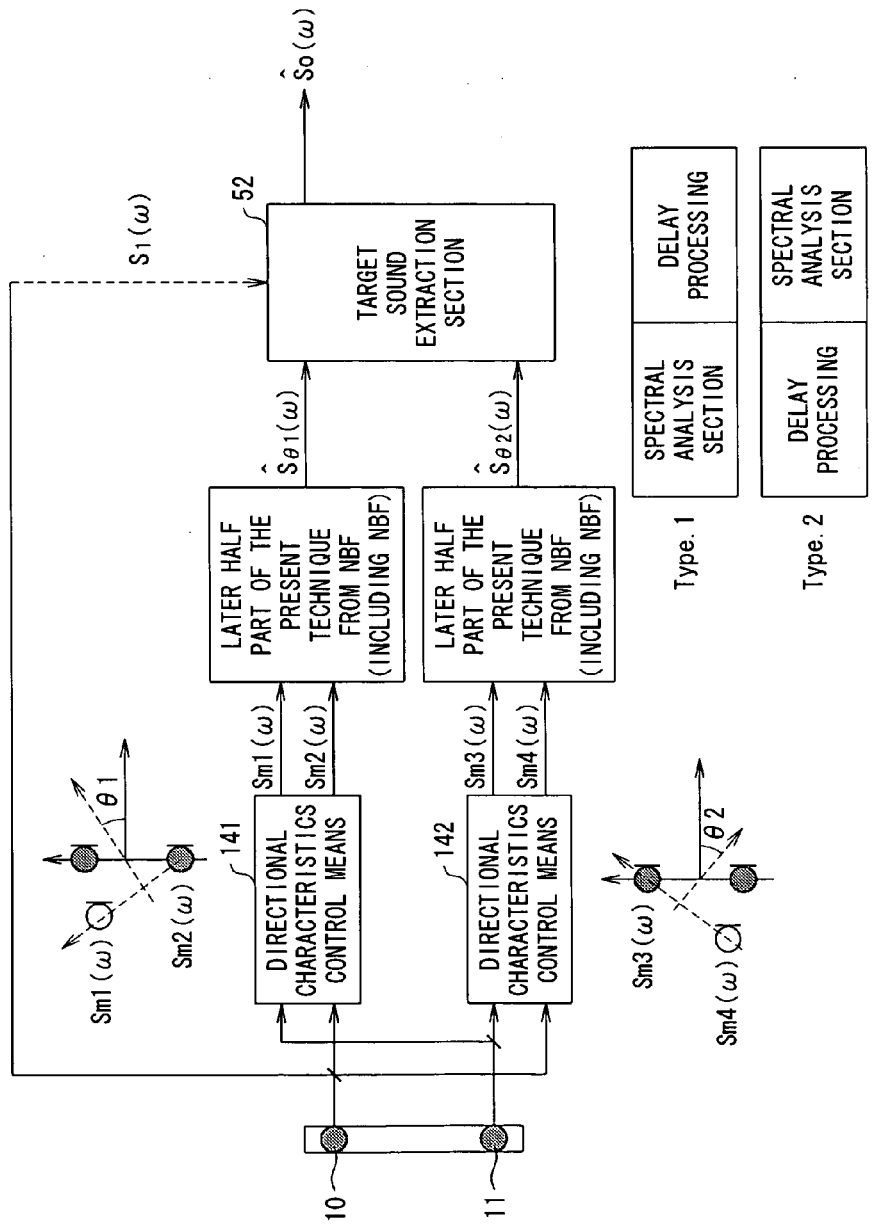
FIG. 37 is a diagram which shows a configuration example of a sound source separation device system according to the embodiment.

FIG. 37 shows a configuration example of a sound source separation device system according to the present embodiment. Directional characteristics control means 141 and 142 are composed of spectrum analysis sections 20 and 21 and delay elements which performs delay processing. In a processing sequence, delay processing may be performed after spectrum analysis processing (Type. 1 in the figure), or spectrum analysis processing may be performed after delay processing (Type. 2 in the figure). Output signals of the directional characteristics control means 141 and 142 are processed by the beamformers 30 and 31 and the power computation sections 40 and 41 or the like, which are blocks in later half part of the present technique from NBF, and the processed signals are inputted to a target sound extraction section 52.

Figure 38:
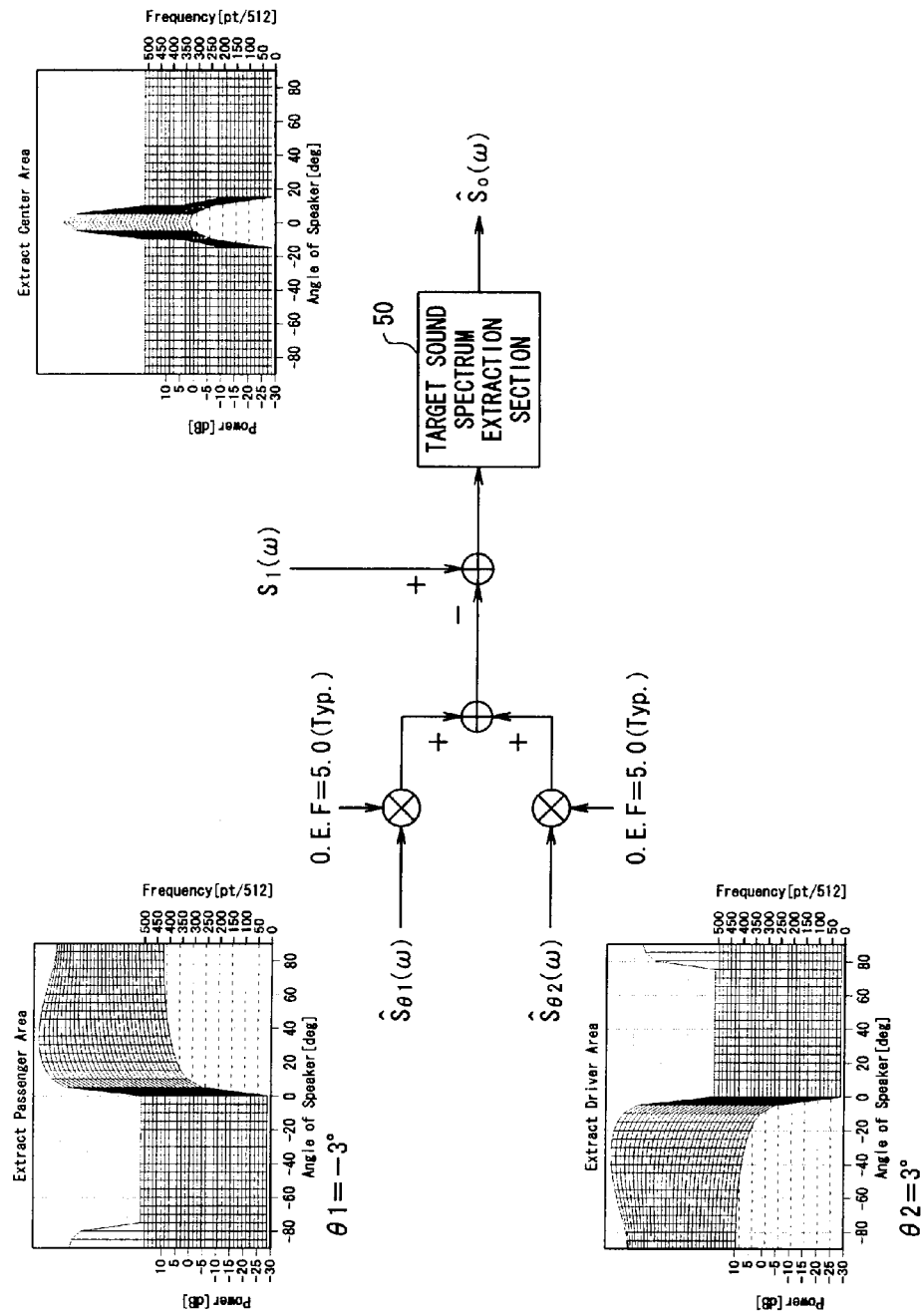
FIG. 38 is a diagram which shows one example of a processing scheme in a target sound extraction section according to the embodiment.
Figure 39:
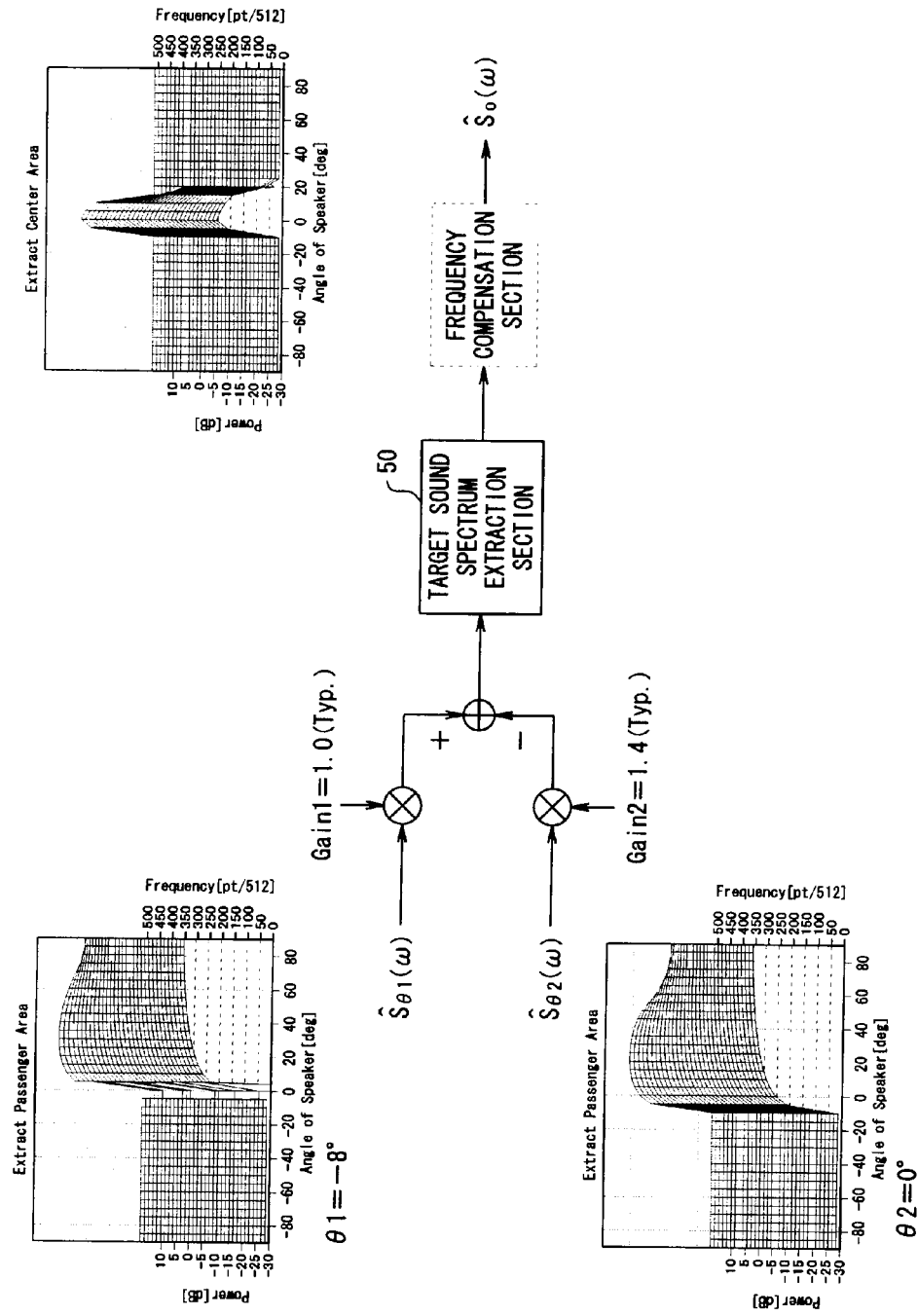
FIG. 39 is a diagram which shows one example of a processing scheme in the target sound extraction section according to the embodiment.

In FIG. 38 and FIG. 39, examples of processing schemes in the target sound extraction section 52 are shown. FIG. 38 shows one example of a processing scheme in which $\theta_1$ and $\theta_2$ are angles symmetrical with respect to the perpendicular line to the straight line connecting the MICs 11 and 12, and FIG. 39 shows one example of a processing scheme in which $\theta_1$ and $\theta_2$ are angles asymmetrical with respect to the perpendicular line.

Ninth Embodiment

Figure 40:
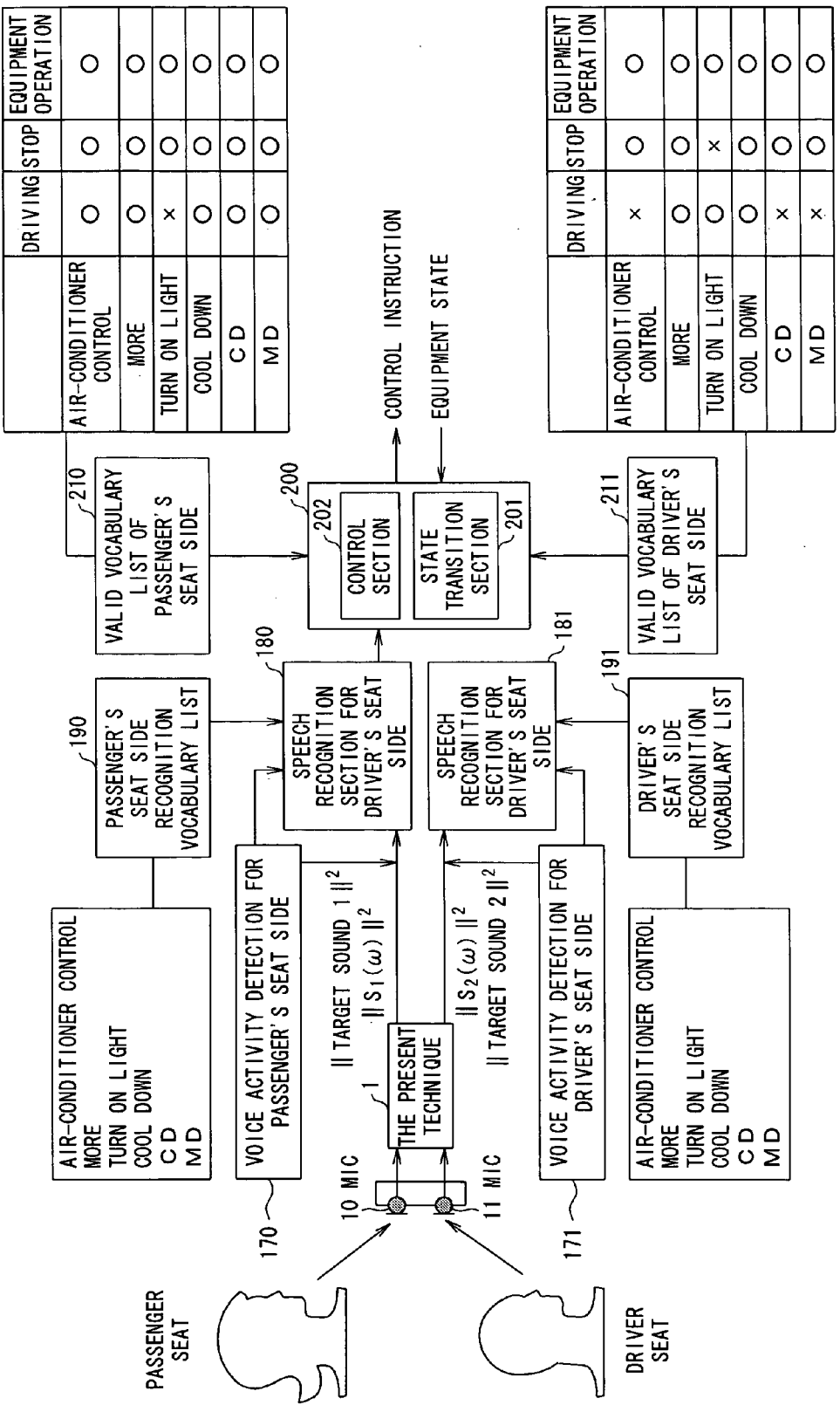
FIG. 40 is a diagram which shows a configuration of a speech recognition system for controlling on-vehicle equipment according to a ninth embodiment.

Next, the ninth embodiment will be described. FIG. 40 is a diagram which shows a configuration of a speech recognition system for controlling on-vehicle equipment according to the ninth embodiment. In the present embodiment, an example in which the sound source separation device 1 according to the present invention is applied to the speech recognition system for controlling on-vehicle equipment provided in a vehicle such as an automobile. In this example of application, speech of the driver's seat and the passenger's seat are captured by the two MICs 10 and 11, the speech of the driver's seat and the passenger's seat are separated by the sound source separation device 1. And control of equipment, system response, and the like are performed by using only valid recognition result of each of the speech from the driver's seat and the passenger's seat depending on voice activity detection, speech recognition processing, speech recognition result and a running state of an automobile and other driving states. Thereby, improvement of reliability, extension of flexibility of response, and the like of the speech recognition system for controlling on-vehicle equipment are provided.

The speech recognition system for controlling on-vehicle equipment stores a passenger's seat side recognition vocabulary list 190, a driver's seat side recognition vocabulary list 191, a passenger's seat side valid vocabulary list 210, and a driver's seat side valid vocabulary list 211 in a storage device, as characteristic data of this system. The driver's seat side recognition vocabulary list 191 is a list of candidates of vocabulary spoken from the driver's seat side, and the passenger's seat side recognition vocabulary list 190 is a list of candidates of vocabulary spoken from the passenger's seat side. The driver's seat side valid vocabulary list 211 is a list of valid vocabulary in the driver's seat side depending on a state of the vehicle (a running state of the automobile and other driving states). The passenger's seat side valid vocabulary list 210 is a list of valid vocabulary in the passenger's seat side depending on a state of the vehicle. "Valid" used herein refers to a state in which output of a control command corresponding to a vocabulary item (a voice command) is allowed.

Operation of the present system will be described with reference to FIG. 40. Speech spoken by a driver in a driver's seat and a passenger in a passenger's seat are captured by the two MICs 10 and 11, separated into a speech of the driver's seat and a speech of the passenger's seat by the sound source separation device 1, and then inputted to voice activity detection sections 170 and 171 and speech recognition sections 180 and 181, which have been prepared for the driver and the passenger in the passenger's seat respectively. In this case, because speech of the two speakers are accurately separated at output of the sound source separation device 1 according to the present embodiment, speech sections of the both speaker can be accurately separated by the passenger's seat side voice activity detection section 170 and the driver's seat side voice activity detection section 171, as well as information in which a speech of the other speaker is suppressed can be provided to the passenger's seat side speech recognition section 180 and the driver's seat side speech recognition section 181, so that speech recognition processing without being affected by a speech of the other speaker can be accurately performed.

In this example of application, speech recognition sections 180 and 181 are provided with the passenger's seat side recognition vocabulary list 190 and the driver's seat side recognition vocabulary list 191 for indicating what kind of vocabulary should be recognized independent of a state of the system, which are dedicated to the sections respectively. Each of the speech recognition sections 180 and 181 performs speech recognition according to these vocabulary lists and outputs a speech recognition result to a control section/state transition section 200.

A state transition section 201 provided in the control section/state transition section 200 can transit to a next state based on the speech recognition result and a current state. A control section 202 provided in the control section/state transition section 200 checks which voice commands can be responded (a control command can be outputted), based on the current state obtained from the state transition section 201 and the speech recognition result from the speech recognition sections 180 and 181, and the passenger's seat side valid vocabulary list 210 and the driver's seat side valid vocabulary list 211 which have been prepared for the passenger's seat side and the driver's seat side respectively. In the valid vocabulary lists 210 and 211 shown in the figure, when a set of a state and a voice command corresponds to "O", response to the voice command is allowed. For example, in the driver's seat side, voice commands to which a response is allowed when a state is "driving" are "more", "turn on light", and "cool down", and voice commands to which a response is forbidden are "air-conditioner control", "CD", and "MD".

Then, response is made only to an allowed voice command, and control is performed for operating an air-conditioner, turning on a light, or so on, so that an occupant of the vehicle can get comfortable in the car. In addition, reliability of the speech recognition system for controlling on-vehicle equipment can be improved as well as higher degree of flexibility of specification design can be provided for creating an application using speech recognition. According to the above described usage example, simultaneous speech of a driver in a drive's seat and a passenger in a passenger's seat can be recognized at the same time, and whether speech is from the driver's seat or the passenger's seat can be surely detected and recognized even if either one speaks, so that behavior of a passenger is not limited, and a speaker and a response to a voice command of the speaker can be designed individually.

Tenth Embodiment

Figure 41A:
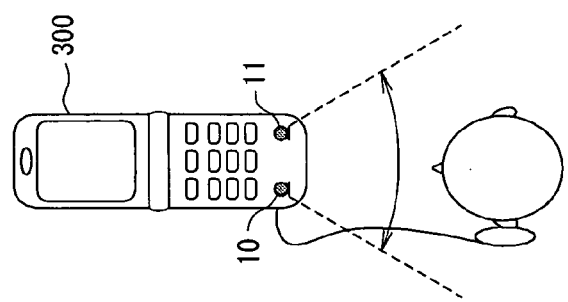
FIGS. 41A and 41B are diagrams which shows a mobile phone according to a tenth embodiment.
Figure 41B:
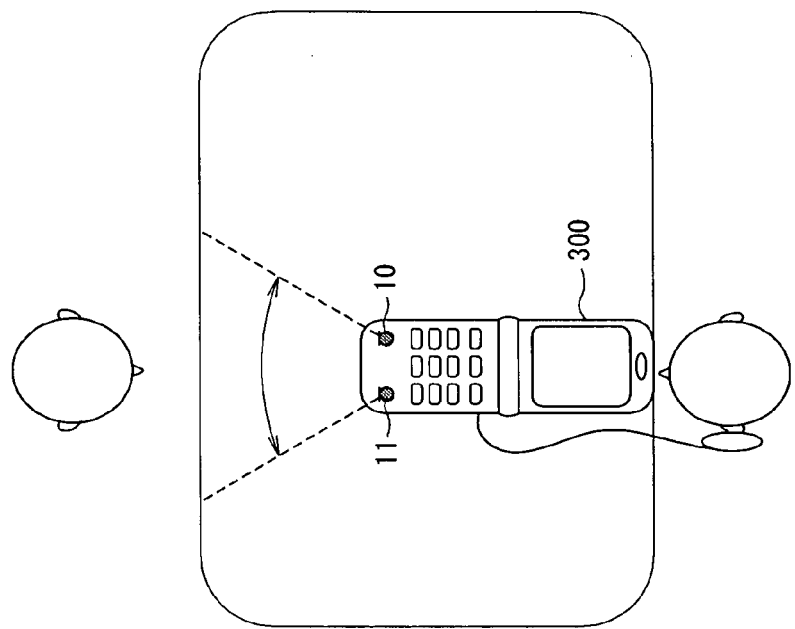

Next, the tenth embodiment will be described. FIGS. 41A and 41B show a mobile phone 300 according to the present embodiment. The mobile phone 300 is mounted with MICs 10 and 11 and a not shown sound source separation device. This mobile phone 300 is normally used for visual telephone, and can be used as a sound collecting microphone by switching a mode. FIG. 41A is a diagram which shows that the MICs 10 and 11 operate as a sound collecting microphone for visual telephone, and FIG. 41B is a diagram which shows that the MICs 10 and 11 operate as a microphone. It can be used in a situation where, in a medium-sized conference room or the like a presenter does not need to use a microphone since the room is not so large, but the room is so spacious that a speech of the presenter is difficult to hear when the voice is small.

As described above, at least two MICs are arranged separately from each other, directional nulls are formed in a time domain or a frequency domain at angles symmetrical with respect to a perpendicular line to a straight line connecting the two MICs by beamformers, signals are converted into a frequency domain if a directional null is formed in a time domain, a difference between power spectrums of the both beamformers is calculated, and coefficient conversion is performed on the obtained result, and thereby directional characteristics having some width with respect to left and right directional nulls are formed, so that sound source separation can be performed. In this way, a feature that a directional characteristics is not affected by sensitivity of MIC elements can be achieved, and without being affected by uneven sensitivity of MIC elements, a deviation from a supposed arrival direction of a sound source and a strong initial reflection can be handled by a moderately wide directional characteristics, and therefore a stable separation characteristics of two sound sources can be achieved.

Eleventh Embodiment

Figure 42:
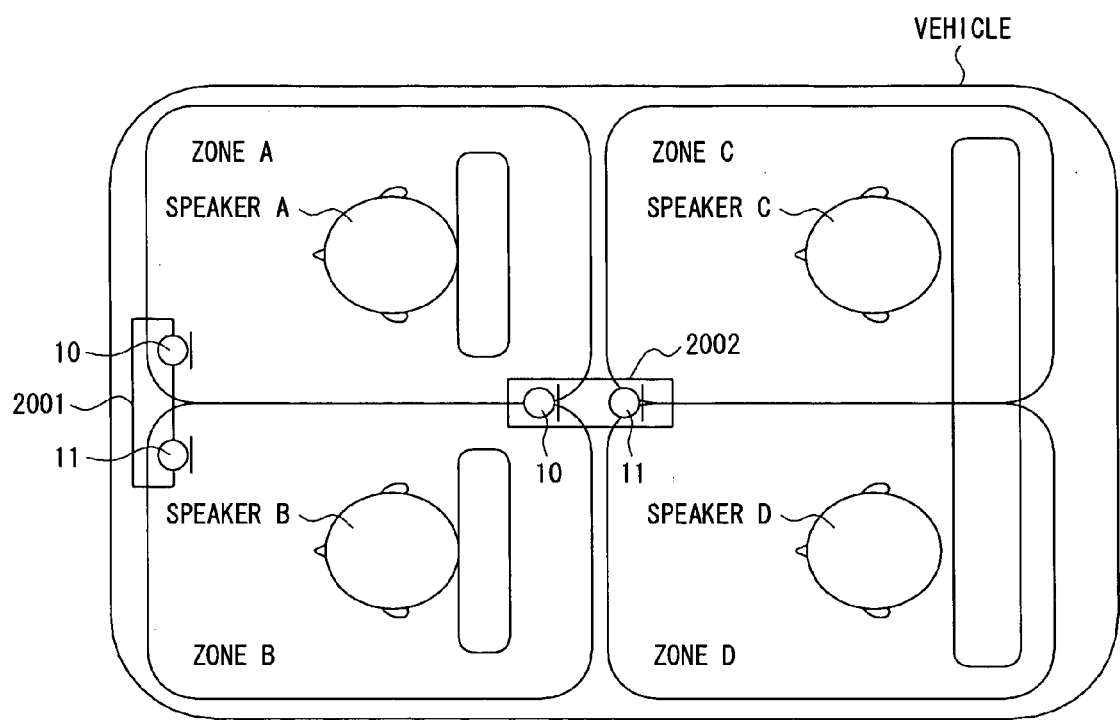
FIG. 42 is a diagram which shows a microphone arrangement in a sound source separation system according to an eleventh embodiment.

Next, the eleventh embodiment will be described. FIG. 42 shows an example in which a target sound in zone A is extracted in a situation where the target sound to be extracted locates in zone A (for example, a zone of a driver's seat) and interfering sounds locates in places other than that (zone B, zone C and zone D). When an array microphone 2001 ((For example, it is located in the front of a car cabin) for example, it is mounted at a rear-view mirror) is used, although sounds locating in zone A/C (for example, zones of a driver's seat and a seat behind it) and zone B/D (for example, zones of a passenger's seat and a seat behind it) can be separated, sounds locating in zone A (for example the zone of the driver's seat) and zone C (for example, the zone of the seat behind it) cannot be separated. However, by providing an array microphone 2002 using the present technique in a position which is a boundary of zone A/B and zone C/D as shown in the figure, sounds locating in zone A/B and zone C/D can be separated, and therefore only a sound locating in zone A can be extracted.

Specifically, if speakers A, B, C and D locating in zone A, B, C and D speak simultaneously, by using the array microphone 2002 placed on the boundary of zone A/B and zone C/D at first, a sound from zone A/B and a sound from zone C/D can be separated. Then, a sound from zone A/C and a sound form zone B/D can be separated by the microphone array 2001. Lastly, the sound from zone A/C obtained by using the microphone array 2001 is compared with the sound from zone A/B obtained by using the microphone array 2002 for each frequency domain, and thereby a frequency component existing in both of the sounds in common can be separated as a sound from zone A. Sounds also from zones B, C and D can be obtained by similar processing respectively.

Twelfth Embodiment

Figure 43:
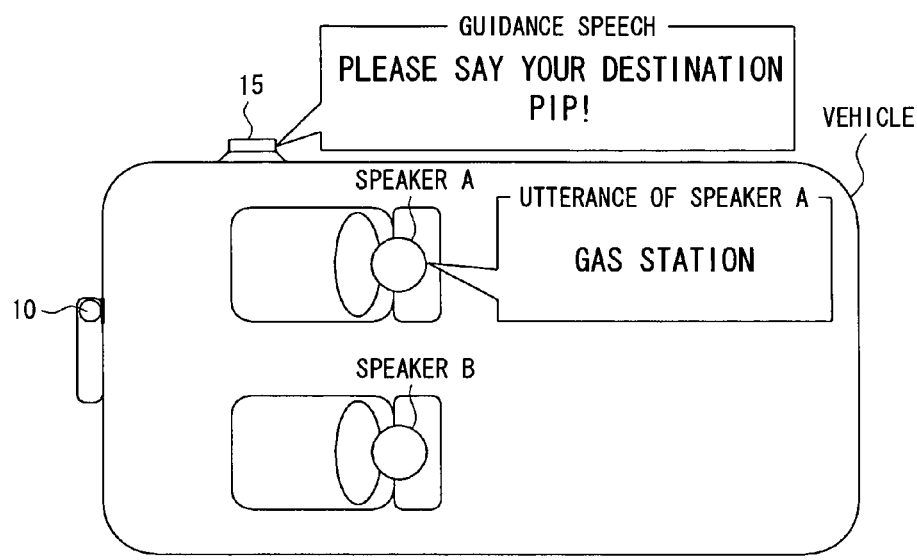
FIG. 43 is a diagram which shows an environment to which a sound source separation system is applied according to a twelfth embodiment.

Next, the twelfth embodiment will be described. In FIG. 43, a situation is assumed where equipment is operated by speech recognition in an environment such as an automobile.

Figure 44:
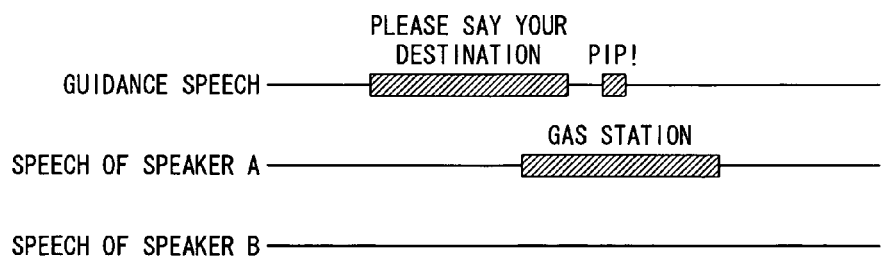
FIG. 44 is a diagram which shows a state of input speech to which the sound source separation system is applied according to the embodiment.

FIG. 44 shows a relation between a guidance speech for the equipment operation and speech of speakers.

In this case, a guidance speech such as "Please say your destination." is played from a loudspeaker 15 to prompt timing of speech of a speaker A, and then a machine sound such as "pip" is played, and after that, the speaker A speaks a voice command. However, as the user gets familiar with equipment operation using voice commands, a situation where the speaker A starts speak during guidance speech is played occurs as shown in FIG. 44, thereby speech recognition performance degrades.

As a measure against such a situation, an echo canceller is generally used to adaptively estimate and eliminate a guidance sound mixed in a sound captured from the MIC 10. As other measures, as shown in FIGS. 45 to 48, spectral subtraction is performed with respect to on input signal to the MIC 10 after frequency analysis (FIG. 45, FIG. 46), and a major contained speech which is guidance speech or speech of speaker A for each frequency component is estimated, and only a frequency component in which major contained speech is the speech of the speaker A is extracted as speech of the speaker A (FIG. 47, FIG. 48).

Figure 47:
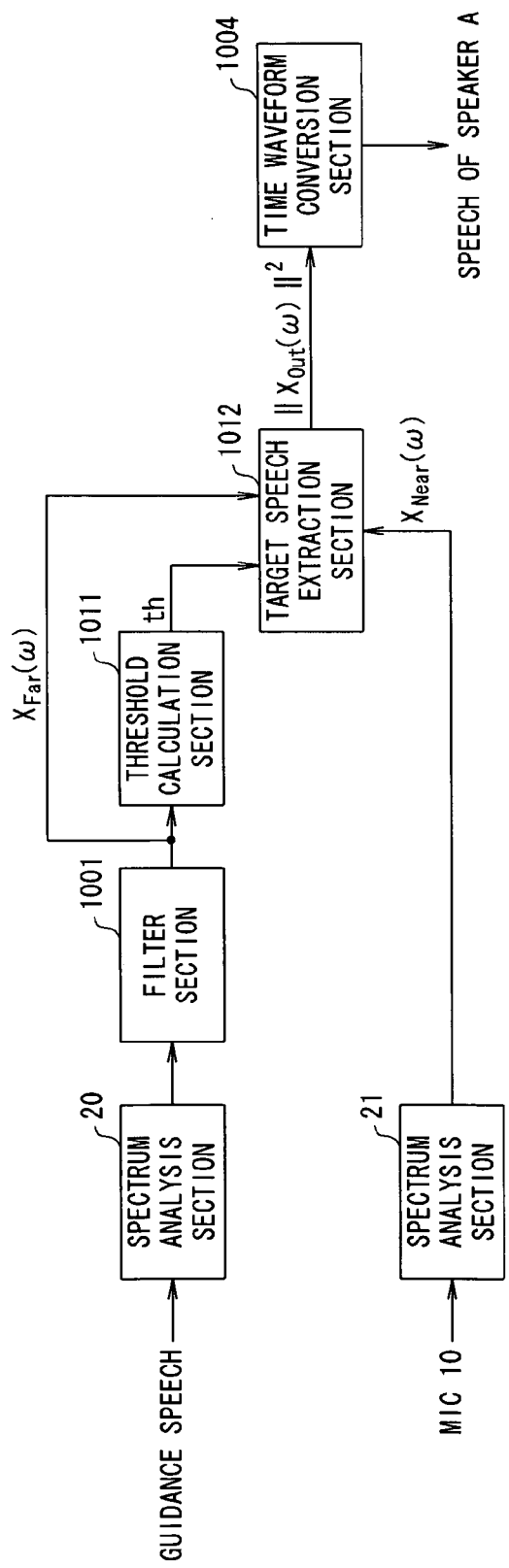
FIG. 47 is a diagram which shows another configuration of the guidance speech elimination section according to the embodiment.
Figure 48:
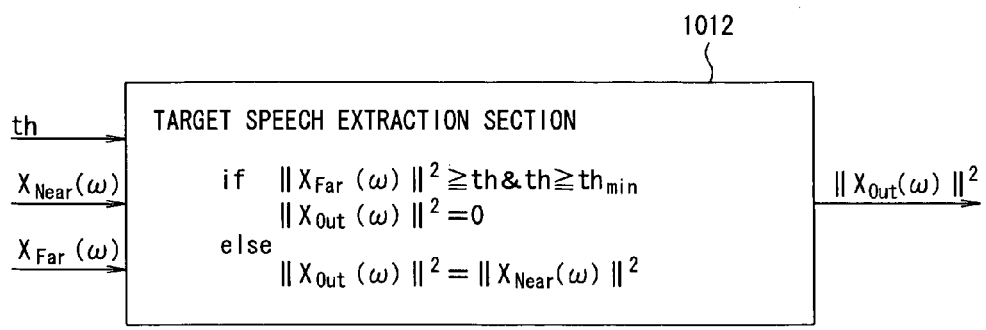
FIG. 48 is a diagram which shows a configuration of a target speech extraction section in the another configuration of the guidance speech elimination section according to the embodiment.

In FIG. 45 and FIG. 47, a filter section 1001 is a filter which simulates an acoustic reflection path from the loudspeaker 15 to the MIC 10, and it may be obtained previously using an impulse response from the loudspeaker 15 to the MIC 10 or may be dynamically obtained by adaptive filter processing.

A gain operation section 1002 is a section for determining an over subtraction factor that is used in performing spectral subtraction, and selects one gain from about 1 to 10 according to volume of the loudspeaker 15 and uses the selected gain.

In addition, a target sound extraction section 1003 in FIG. 45 performs processing as shown in FIG. 46 based on outputs from the gain operation section 1002 and the spectrum analysis section 21 and outputs a signal of processing result to a time waveform conversion section 1004.

A threshold calculation section 1011 in FIG. 47 determines a threshold th based on average energy of guidance speech.

In addition, a target sound extraction section 1012 in FIG. 47 performs processing as shown in FIG. 48 based on outputs from the threshold calculation section 1011 and the spectrum analysis section 21 and outputs a signal of processing result to the time waveform conversion section 1004. Incidentally, $th_{mim}$ shown in FIG. 48 becomes a threshold value for determining that $X_{Far}(\omega)$ shown in the figure is a valid input.

In addition, the time waveform conversion section 1004 performs processing similar to the time waveform conversion sections 70 and 71 of the first embodiment.

Figure 49:
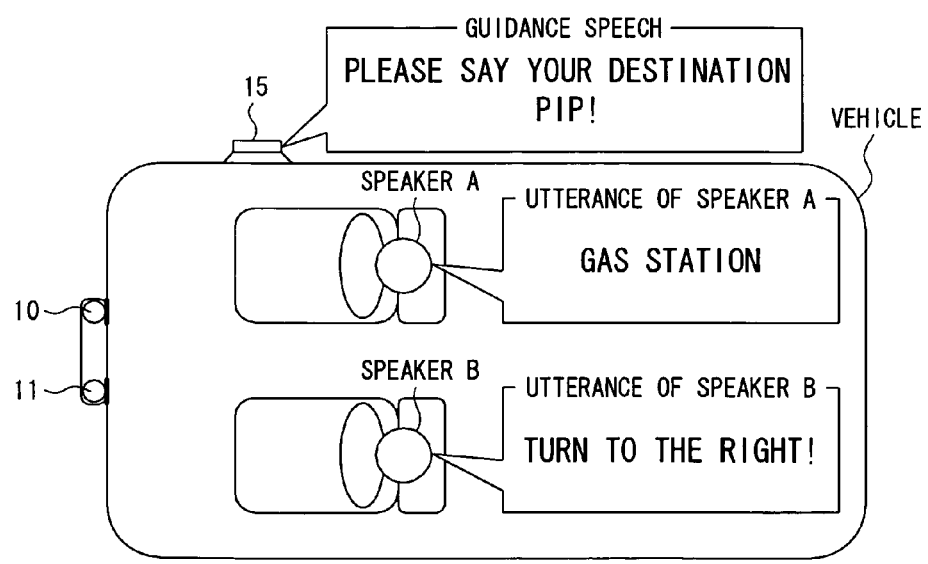
FIG. 49 is a diagram which shows another environment to which the sound source separation system is applied according to the embodiment.
Figure 50:
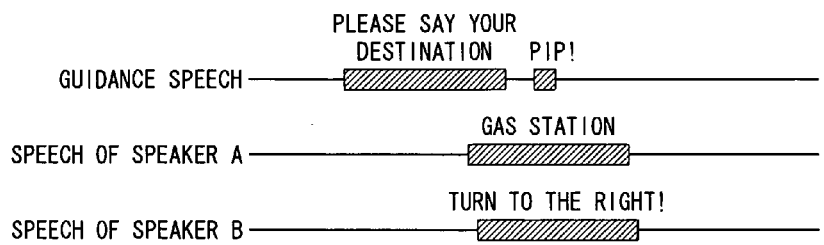
FIG. 50 is a diagram which shows another state of input speech to which the sound source separation system is applied according to the embodiment.

The conventional method can handle a situation where only the speaker A speaks by the above described configuration as shown in FIG. 43. However, there may be a case where not only the speaker A but also the speaker B speaks as shown in FIG. 50 when there are not only the speaker A (for example, an occupant in the driver's seat) but also the speaker B (for example, an occupant in the passenger's seat) as shown in FIG. 49, and this situation cannot be handled by the above described configuration.

Figure 51:
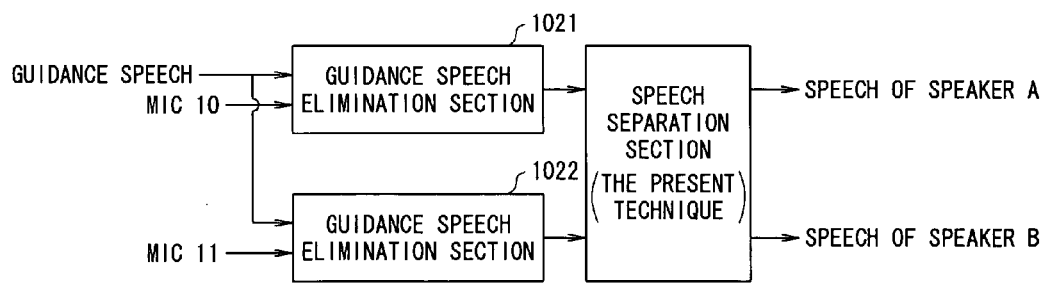
FIG. 51 is a diagram which shows another configuration of the sound source separation system according to the embodiment.

As shown in FIG. 51, this situation can be handled by combining the present technique with guidance speech elimination sections 1021 and 1022 shown in FIG. 45 or 47.

Specifically, in FIG. 51, an input on which a guidance speech, a speech of the speaker A, and a speech of the speaker B are superimposed is given to the MIC 10 and the MIC 11 in a situation where a guidance speech is played from the loudspeaker 15 and both the speaker A and the speaker B speak simultaneously. In this case, the guidance sound deleting section 1021 and the guidance speech elimination section 1022 eliminate the guidance speech by the method shown in FIG. 45 or 47, and as a result, outputs a signal on which both speech of the speaker A and the speaker B are superimposed. In addition, to avoid waste of computation for input to the present technique to be used as post-processing, a frequency component is inputted to the present technique (FIG. 1) as is without being converted back to a time waveform. Processing of a spectrum analysis section is omitted since frequency component information is inputted in the latter stage of the present technique, and it is directly inputted to a beamformer section and processed by applying the present technique, so that a speech of the speaker A and a speech of the speaker B can be obtained as an output result independently, and therefore reliability and performance of the speech recognition device and flexibility of application can be greatly enhanced.

In addition, by combination of the above described various functions and delay operation of a signal from a MIC, a directional characteristics that is narrow in front direction can be provided and a sound source signal only from a specific direction can be detected.

In addition, since high separation performance can be ensured even in low frequencies without widening an interval between MICs, space for implementation can be reduced and application to portable devices and the like is allowed.

In the above described embodiments, each functional block of a sound source separation system is implemented by a program, it may be implemented by hardware using circuitry or the like.

INDUSTRIAL APPLICABILITY

The present invention is applicable to all of industries in which sound sources needs to be accurately separated such as for a speech recognition device, a car navigation system, a sound collector, a recorder, and control of equipment by a voice command.

The invention claimed is:

1. A sound source separation device for separating a sound source signal of a target sound source from a mixed sound which includes sound source signals emitted from a plurality of sound sources using at least two microphones arranged separately from each other comprising:
    beamforming means for
        performing a first beamforming processing to attenuate a sound source signal arriving from a predetermined direction by performing computations using first coefficients on an output signal of said microphones, and
        performing a second beamforming processing to attenuate a sound source signal arriving from a direction symmetrical to said predetermined direction with respect to a perpendicular line to a straight line connecting the two microphones by performing computations using second coefficients which are complex conjugate of said first coefficients in a frequency domain on the output signal of said microphone;
    power computation means for computing power spectrum information with respect to each of sound source signals obtained by said beamforming means; and
    target sound spectrum extraction means for extracting spectrum information of a target sound source based on a difference between the power spectrum information calculated by said power computation means.

2. The sound source separation device according to claim 1, wherein said beamforming means applies said first beamforming processing and said second beamforming processing to each of a combination of any two microphones among three microphones which arranged separately from each other and another combination of two microphones among said three microphones.

3. The sound source separation device according to claim 1 or 2, further comprising directional characteristics control means for applying a delay to an output signal of a microphone.

4. The sound source separation device according to claim 3, wherein said directional characteristics control means virtually generates output signals of three microphones by applying a delay to an output signal of at least one microphone among two microphones.

5. The sound source separation device according to claim 3, further comprising arrival direction estimating means for estimating a arrival direction of said sound source signal, wherein said directional characteristics control means applies a delay to an output signal of the microphone such that two sound sources virtually locate symmetrically with respect to a perpendicular line to a straight line connecting the two microphones based on an arrival direction estimated by said arrival direction estimating means.

6. The sound source separation device according to claim 1 or 2, further comprising spectral subtraction means for performing spectral subtraction processing on the power spectrum information extracted by said target sound spectrum extraction means.

7. The sound source separation device according to claim 1 or 2, further comprising stationary noise reduction means for performing processing to reduce noise before the processing by said beamforming means is performed.

8. A speech recognition device comprising speech recognition means for performing speech recognition of a sound source signal separated by the sound source separation device according to claim 1 or 2.

9. The speech recognition device according to claim 8, further comprising recognition vocabulary list storage means for storing a driver seat side recognition vocabulary list which is a list of candidates of vocabulary spoken from a driver's seat side of a vehicle and a passenger's seat side recognition vocabulary list which is a list of candidates of vocabulary spoken from a passenger's seat side, wherein said speech recognition means performs speech recognition processing of a sound source signal separated by said sound source separation device based on the driver's seat side recognition vocabulary list and the passenger's seat side recognition vocabulary list stored in said recognition vocabulary list storage means.

10. The speech recognition device according to claim 8, further comprising:
state transition means for managing a current state of a vehicle;
valid vocabulary list storage means for storing a valid vocabulary list of the passenger's seat side and the driver's seat side depending on a state of the vehicle; and
control means for determining whether a vocabulary item recognized by said speech recognition means is valid or not based on the current state of the vehicle managed by said state transition means and the vocabulary list stored in said valid vocabulary list storage means, and controlling depending on the determination result.

11. A mobile phone comprising the sound source separation device according to claim 1 or 2.

12. A sound source separation method comprising:
a sound source signal receiving step of inputting sound source signals emitted from a plurality of sound sources to at least two microphones arranged separately from each other;
a beamforming processing step of performing a first beamforming processing and a second beamforming processing to attenuate sound source signals arriving from predetermined directions symmetrical with respect to a perpendicular line to a straight line connecting two microphones respectively by performing computations using two weighted coefficients which are complex conjugate to each other in a frequency domain on an output signal of said microphone respectively;
a power computation step of computing power spectrum information with respect to each of sound source signals obtained in said beamforming processing step; and
a target sound spectrum extracting step of extracting spectrum information of a target sound source based on a difference between the power spectrum information calculated in said power computation step.

13. A tangible, non-transitory, computer-readable storage medium storing instructions that, when executed by a processor, cause the processor to perform a sound source separation method, comprising:
acquiring an output signal which includes sound source signals emitted from a plurality of sound sources are mixed from at least two microphones arranged separately from each other;
performing a first beamforming processing and a second beamforming processing to attenuate the sound source signals arriving from predetermined directions symmetrical with respect to a perpendicular line to a straight line connecting the two microphones respectively by performing computations using two weighted coefficients which are complex conjugate to each other in a frequency domain on the acquired output signal;
computing power spectrum information with respect to each of the sound source signals; and
extracting spectrum information of a target sound source based on a difference between the computed power spectrum information.

* * * * *

UNITED STATES PATENT AND TRADEMARK OFFICE
CERTIFICATE OF CORRECTION

| | | |
|---|---|---|
| PATENT NO. | : 8,112,272 B2 | Page 1 of 1 |
| APPLICATION NO. | : 11/990200 | |
| DATED | : February 7, 2012 | |
| INVENTOR(S) | : Katsumasa Nagahama et al. | |

It is certified that error appears in the above-identified patent and that said Letters Patent is hereby corrected as shown below:

Claim 5, column 27, line 15, "a arrival" should read -- an arrival --.

Signed and Sealed this
Twenty-ninth Day of January, 2013

David J. Kappos
*Director of the United States Patent and Trademark Office*

UNITED STATES PATENT AND TRADEMARK OFFICE
CERTIFICATE OF CORRECTION

PATENT NO.         : 8,112,272 B2
APPLICATION NO.    : 11/990200
DATED              : February 7, 2012
INVENTOR(S)        : Katsumasa Nagahama et al.

Page 1 of 1

It is certified that error appears in the above-identified patent and that said Letters Patent is hereby corrected as shown below:

Title page, item 73, line 1, "Asashi" should read --Asahi--.

Signed and Sealed this
Nineteenth Day of March, 2013

Teresa Stanek Rea
*Acting Director of the United States Patent and Trademark Office*